US012736283B2

(12) United States Patent
Seehausen, Jr.

(10) Patent No.: US 12,736,283 B2
(45) Date of Patent: Sep. 15, 2026

(54) PORTABLE DRYER DEVICE AND FAN UNIT

(71) Applicant: POWDRY DEVELOPMENT, LLC, Lewisville, NC (US)

(72) Inventor: Robert Howard Seehausen, Jr., Lewisville, NC (US)

(73) Assignee: POWDRY DEVELOPMENT, LLC, Lewisville, NC (US)

( * ) Notice: Subject to any disclaimer, the term of this patent is extended or adjusted under 35 U.S.C. 154(b) by 912 days.

(21) Appl. No.: 17/725,975

(22) Filed: Apr. 21, 2022

(65) Prior Publication Data

US 2022/0341661 A1 Oct. 27, 2022

Related U.S. Application Data

(60) Provisional application No. 63/177,425, filed on Apr. 21, 2021.

(51) Int. Cl.
*F26B 9/00* (2006.01)
*D06F 60/00* (2009.01)
*F26B 3/04* (2006.01)
*F26B 21/50* (2026.01)

(52) U.S. Cl.
CPC .............. *F26B 9/003* (2013.01); *D06F 60/00* (2013.01); *F26B 3/04* (2013.01); *F26B 21/50* (2026.01)

(58) Field of Classification Search
CPC .......... F26B 9/003; F26B 3/04; F26B 21/004; F26B 21/008; F26B 21/001; D06F 60/00
USPC .......................................................... 34/433
See application file for complete search history.

(56) References Cited

U.S. PATENT DOCUMENTS

| | | | | |
|---|---|---|---|---|
| 4,171,580 | A | 10/1979 | Vabrinskas | |
| 4,543,912 | A * | 10/1985 | Steudler, Jr. | A01K 39/02 119/72 |
| 4,967,060 | A | 10/1990 | Lomeli | |
| 5,222,308 | A * | 6/1993 | Barker | F26B 21/006 34/239 |
| 5,289,642 | A | 3/1994 | Sloan | |
| 7,389,596 | B2 | 6/2008 | Parks | |
| 10,655,914 | B2 | 5/2020 | Seehausen, Jr. | |
| 2013/0326898 | A1 | 12/2013 | Quessard | |
| 2015/0037015 | A1 | 2/2015 | Lee | |
| 2016/0090684 | A1* | 3/2016 | Smoots | D06F 59/04 34/104 |
| 2016/0370112 | A1* | 12/2016 | Lee | A61L 2/24 |

* cited by examiner

*Primary Examiner* — John P Mccormack
(74) *Attorney, Agent, or Firm* — Seth L. Hudson; Maynard Nexsen PC

(57) ABSTRACT

A portable drying device that includes a fan unit that distributes air through the device, at least one drying manifold having a first end, a second end, and at least one outlet between the first end and the second end for distributing the drying air. The device further includes at least one dryer attachment selectively secured to the at least one opening of the at least one drying manifold.

20 Claims, 21 Drawing Sheets

PORTABLE DRYER DEVICE AND FAN UNIT

CROSS REFERENCE TO RELATED PATENT APPLICATION

The present patent application/patent claims the benefit of priority of U.S. Provisional Patent Application No. 63/177,425, filed on Apr. 21, 2021, and entitled "PORTABLE DRYER DEVICE AND FAN UNIT," the contents of which are incorporated in full by reference herein.

FIELD OF THE INVENTION

The present invention relates generally to a device for drying articles, and more generally relates to a portable dryer, that can be modular and included in a kit and easily assembled therefrom, for drying a plurality of articles of clothing and goods, including, but not limited to, boots, gloves, hats, skates, waders, wetsuits, shoes, including shoes used for sports, such as football, soccer, and golf, and the like in a number of configurations, including mounted on a wall, to allow for different spatial requirements and numerous variations of articles for drying.

BACKGROUND OF THE INVENTION

Various devices have been patented for the purpose of drying boots and other articles of clothing. To reduce the disadvantages of prior art boot drying structures, typically of a bulky, non-portable and limiting construction, the immediate invention attends to the deficiencies thereof not only by providing a compact and efficient structure, but further includes a design facilitating ease of transport, expansion and configuration to meet limited space requirements to accommodate a greater number and greater variety of boot pairs, shoes, gloves and other articles of clothing to be dried. The prior structures can only accommodate one or two pairs of boots or gloves. The design and structure of the immediate invention can accommodate numerous pairs of boots and/or gloves and facilitates packing and transport based upon its portable and modular design, allowing the invention to be easily and efficiently packed into luggage for vacations or transported for another purpose. The invention may also be mounted to a structure, such as a wall. The instant invention further attends to deficiencies of the prior art thereof by providing a design facilitating ease of deconstruction and storage when not in use, wherein the drying air may be ambient air, air with moderate heat containing slightly heated air, or heated air heated by a heating element contained within a fan unit.

U.S. Pat. No. 5,289,642 discloses a portable dryer for drying the interior of ski boots, ski gloves, etc. The device includes articulated tubing for insertion into the toe portion of a ski boot. At the other end of the articulated tubing is a distribution connector for connecting a means of forcing air through the tubing and into the interior of the ski boot for drying purposes.

U.S. Pat. No. 4,171,580 discloses a boot dryer with a housing having an ingress port and an egress port with a motor driven fan therein. A pair of flexible hoses are secured to the ports of the housing and extend downwardly therefrom when the housing is supported by a wire-like hook pivotably secured to the uppermost regions of the housing. The hoses are inserted into a pair of boots and a slow cool flow of air enters one boot and circulates upwardly through one hose and through the housing and then downwardly through the other hose.

U.S. Pat. No. 7,389,596 discloses a drying rack that fits within a dryer's drum. The rack comprises an open container divided into two mirror imaged halves joined together by an adjustable connector arm that can be a telescopic arm. A strap and holding posts are located in each half for keeping one or more pairs of shoes in place during drying.

Accordingly, there remains a need for a new and improved boot drying apparatus as set forth by the instant invention which addresses the problems of ease of use, effectiveness in construction, modular, as well as the portable and fixed nature of the device and in this respect, the present invention considerably fills this need and allows for a plurality of gloves and boots to be dried simultaneously and/or a combination of boots and gloves to be dried simultaneously.

BRIEF SUMMARY OF THE INVENTION

According to an embodiment of the present invention, a portable modular dryer device that may be mounted to a wall or the like includes a fan unit that distributes air and heat through the device, at least one drying manifold having a first end, a second end, and at least one opening between the first end and the second end for distributing the drying air. The device further includes at least one dryer attachment engaged thereto.

According to another embodiment of the present invention, a portable modular dryer device includes an end cap selectively secured to the second end of the least one drying manifold.

According to yet another embodiment of the present invention, a portable modular dryer device wherein the dryer attachment is a boot dryer attachment.

According to yet another embodiment of the present invention, a portable modular dryer device wherein the dryer attachment is a glove/shoe dryer attachment.

According to yet another embodiment of the present invention, a kit for drying an article of clothing that includes at least one drying manifold, at least one fan unit, and at least one dryer attachment.

According to yet another embodiment of the present invention, a kit for drying an article of clothing that includes a mounting apparatus for mounting to a wall or the like.

According to yet another embodiment of the present invention, a kit for drying an article of clothing that includes at least one coupler device.

According to another embodiment of the present invention, the portable modular dryer device includes a fan unit that distributes air and heat through the device, a distributing manifold, at least one drying manifold having a first end, a second end, and at least one opening between the first end and the second end for distributing the drying air. The device further includes at least one dryer attachment engaged thereto.

According to yet another embodiment of the present invention, a method for drying an article of clothing that includes providing a fan unit, a coupler device for receiving the fan unit, at least one drying manifold having a first end, a second end, and at least one opening between the first end and second end for distributing the drying air, and at least one dryer attachment selectively secured to the at least one opening of the at least one drying manifold.

According to yet another embodiment of the present invention, a method for drying an article of clothing that includes providing a dryer attachment engaged to the drying manifold.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
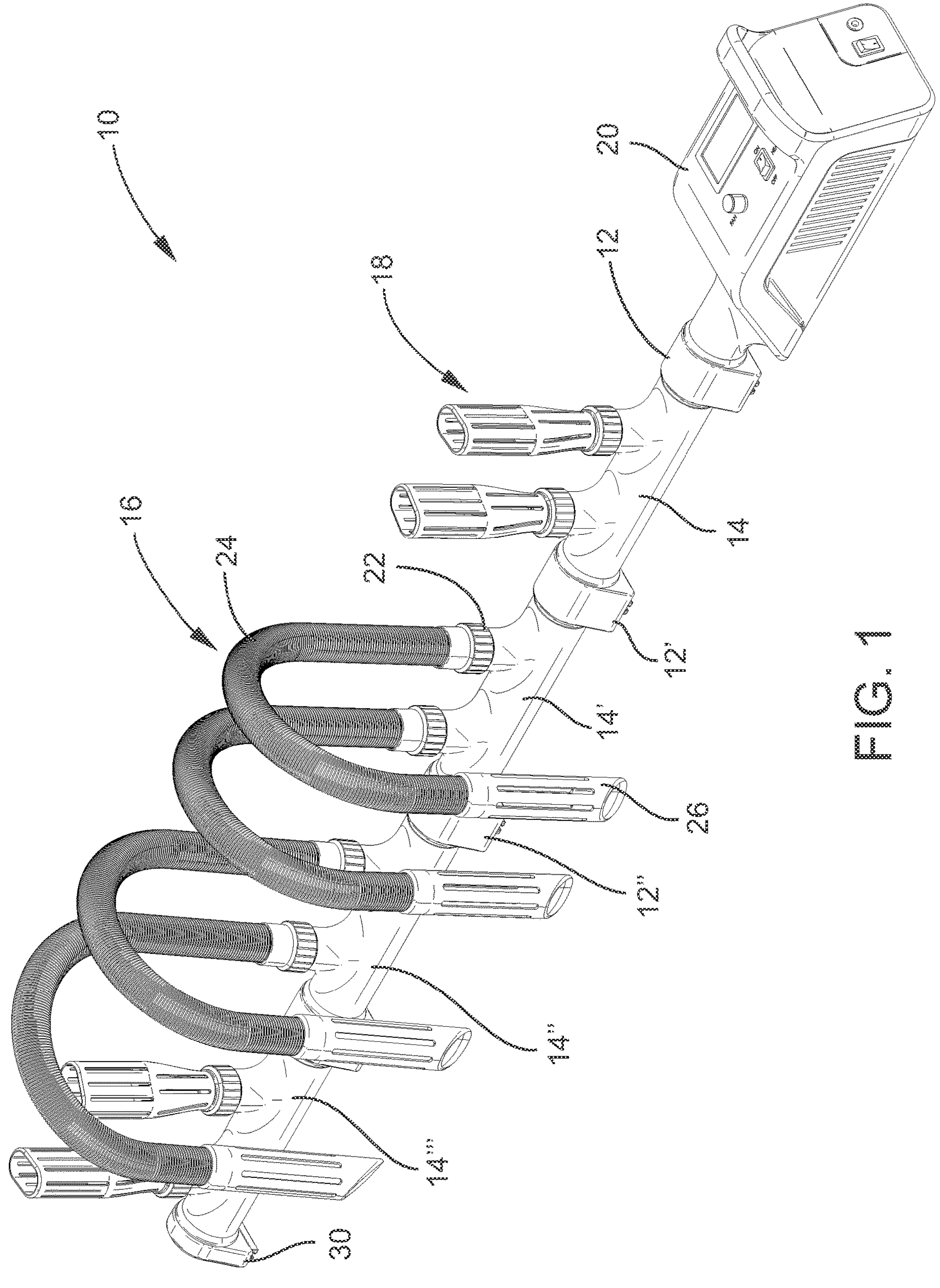
FIG. 1 is a perspective view of an exemplary embodiment of the portable dryer device and fan unit of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, a first embodiment of a portable dryer device is illustrated in FIGS. 1-12 and is shown generally at reference numeral 10. The portable modular dryer device 10 generally comprises a coupler device 12, at least one drying manifold 14, and a dryer attachment, such as at least one boot dryer attachment 16, and/or at least one glove/shoe dryer attachment 18. As illustrated in FIGS. 1-12, a fan unit 20 is engaged to a drying manifold 14 by way of the coupler device 12. The fan unit 20 forces drying air through the entire device 10. The coupler device 12 has a first side and a second side. The outlet of the fan unit 20 is engaged to the first side of the coupler device 12 and a first side of the drying manifold 14 is engaged to the second side of the coupler device 12. The coupler device 12 accepts the forced drying air flowing from the fan unit 20, employing either heated or non-heated drying air, the flow is directed into the drying manifold 14. The drying air may be ambient air, air with moderate heat containing slightly heated air, or heated air.

The coupler device 12 has an outer housing with a hollow passageway that is generally circular and extends from the first side to a second side of the coupler device 12. The outer housing may have a flat bottom portion that extends outward to a first edge and a second edge to allow the coupler device 12 to be placed flush with a wall, table, floor, or other flat surface. An arcuate shaped top portion extends from the first edge to the second edge with a flat bottom portion. The bottom portion may also contain an mounting member 68, as described in further detail below for mounting to a mounting apparatus 28. A lip 66 is disposed on the first side and the second side of the coupler 12. The lip 66 is preferably circular and surrounds the opening of the passageway on the front side and the second side of the coupler 12. The lip 66 may be composed of any material, such as plastic, rubber, or composites thereof. The lip 66 may assist with mating the coupler 12 to adjacent parts and pieces as further described herein.

As illustrated, the outlet 58 of the fan unit 20 is generally circular for mating with the first end of the coupler device 12 that is also generally circular. The outlet 58 of the fan unit 20 has a first end and a second end, and the second end preferably has a diameter slightly less than the diameter of the passageway of the coupler device 12, allowing the second end of the outlet 58 to be received within the opening of the passageway on the first end of the coupler device 12 and selectively secured therein by friction fit. The second end of the outlet has an outside diameter slightly less than the outside diameter of the first end. As the outlet 58 protrudes outward from the front side of the top portion 36, at a predetermined distance, the outside diameter of the outlet 58 is reduced. A skirt is formed at the transition between the larger outside diameter and the reduced outside diameter. The skirt circumscribes the outlet 58 and extends in the axial direction of the outlet 58, forming a smooth and flat contact point. While the outlet of the fan unit 20 is illustrated and described as circular, other shapes may be utilized, such as square, r, hexagonal and the like. The shape of the opening of the passageway within the coupler device 12 and the outlet of the fan unit 20 should correspond for engaging these components.

The first end of the drying manifold 14 may be generally circular shaped with a diameter slightly less than the diameter of the passageway of the coupler device 12. The first end of the drying manifold 14 is received within the opening of the passageway in the second end of the coupler device 12 and selectively secured therein by friction fit.

Figure 5:
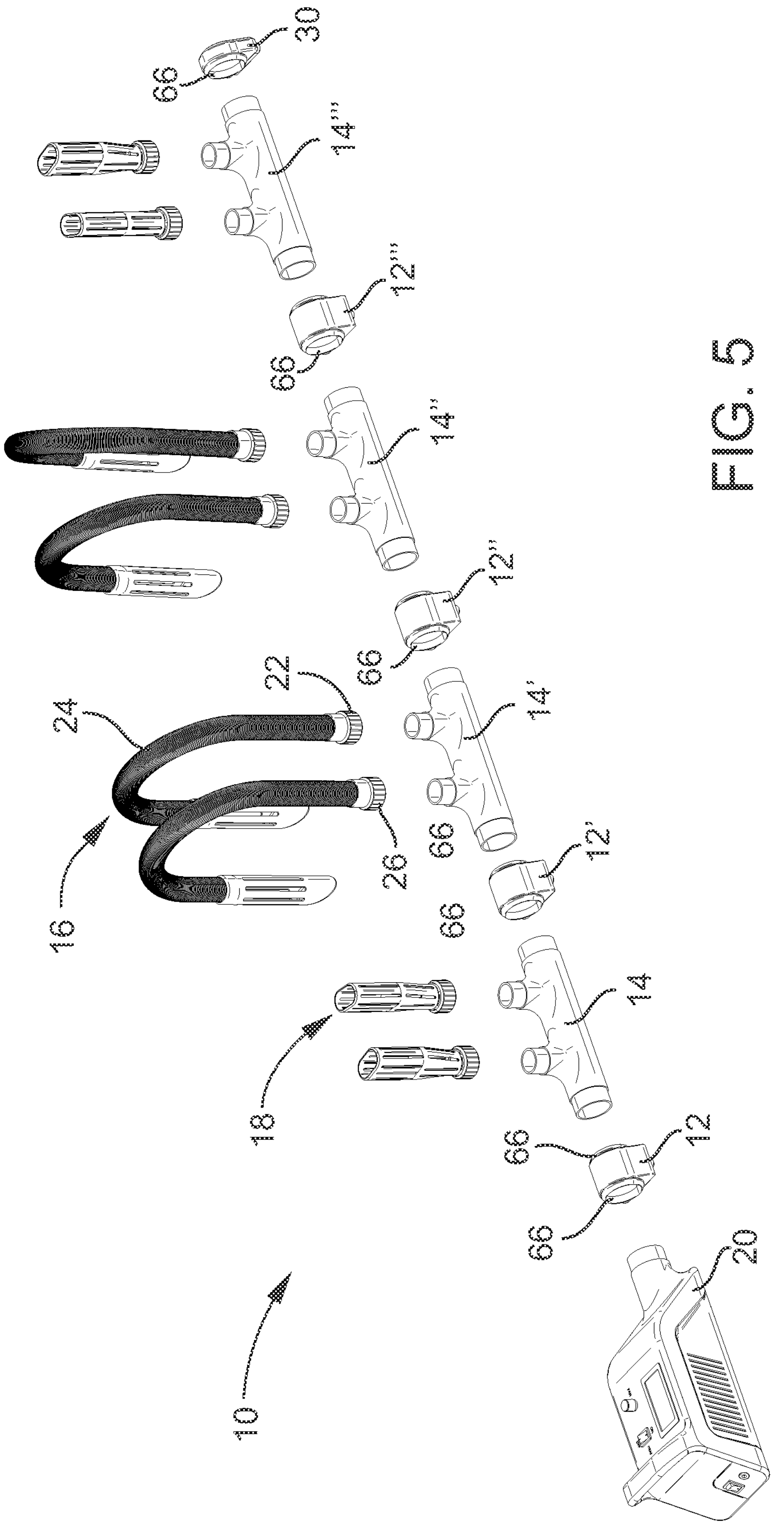
FIG. 5 is an exploded view of an exemplary embodiment of the portable dryer device and fan unit of the present invention.

The drying manifold 14 is generally hollow and comprises a first end, a second end, at least one outlet disposed between the first end and the second end, and an outer surface and inner surface. As illustrated in FIG. 5, the drying manifold 14 has two spaced-apart outlets disposed between the first end and second end. As illustrated, the drying manifold 14 has a first portion, a second portion, and a third portion. The first end and second end are contained on the first portion, and an outlet is contained on the second portion, and an outlet is contained on the second portion. The second portion and third portion consist of an elongate hollow tube that extends upwardly from the first portion. As illustrated, the second portion and third portion extend at an angle of about 90 degrees from the first portion. The outlets of the second portion and the third portion allow a portion of the drying air traveling through the first end to exit openings on the second portion and third portion. The remaining drying air proceeds through the drying manifold 14, and if an adjacent drying manifold is positioned downstream the drying air flow, the remaining drying air proceeds into the adjacent drying manifold and any additional drying manifolds positioned downstream.

The first end and the second end of the drying manifold 14 has an outside diameter slightly less than the diameter of the opening in a coupler 12. As the first end and the second end protrude outward to the outer edge of the first end and the second end, at a predetermined distance, the outside diameter of the first end and the second end is reduced.

A skirt is formed at the transition between the larger outside diameter and the reduced outside diameter. The skirt circumscribes the first end and the second end and extends in the axial direction of the first end and the second end, forming a smooth and flat contact point. The first end of the drying manifold 14, having a diameter slightly less than the diameter of the opening of the passageway in the second end of the coupler device 12, is inserted into the second end of the coupler device 12, allowing the first end to slide into the passageway until the lip 66 of the coupler device 12 is adjacent the skirt on the first end of the drying manifold 14. The first end of the drying manifold 14 is selectively secured within the passageway by friction fit. The lip 66 of the coupler device 12 preferably contacts the skirt on the first end of the drying manifold 14, preventing the drying air or at least a quantity of drying air that is undesirable to a user or prevents the portable dryer device 10 from operating efficiently and/or effectively.

Figure 2:
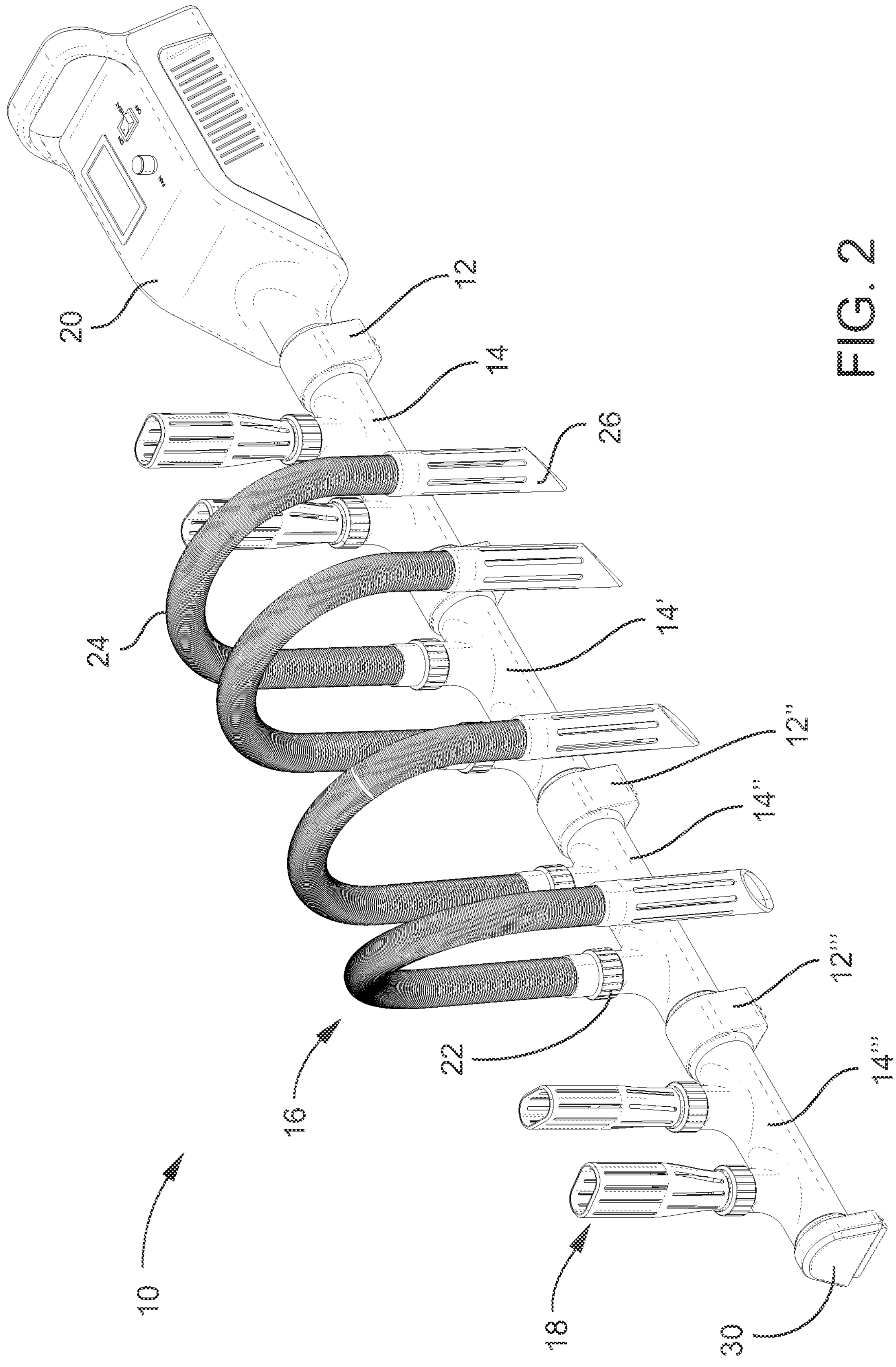
FIG. 2 is a perspective view of an exemplary embodiment of the portable dryer device and fan unit of the present invention.
Figure 3:
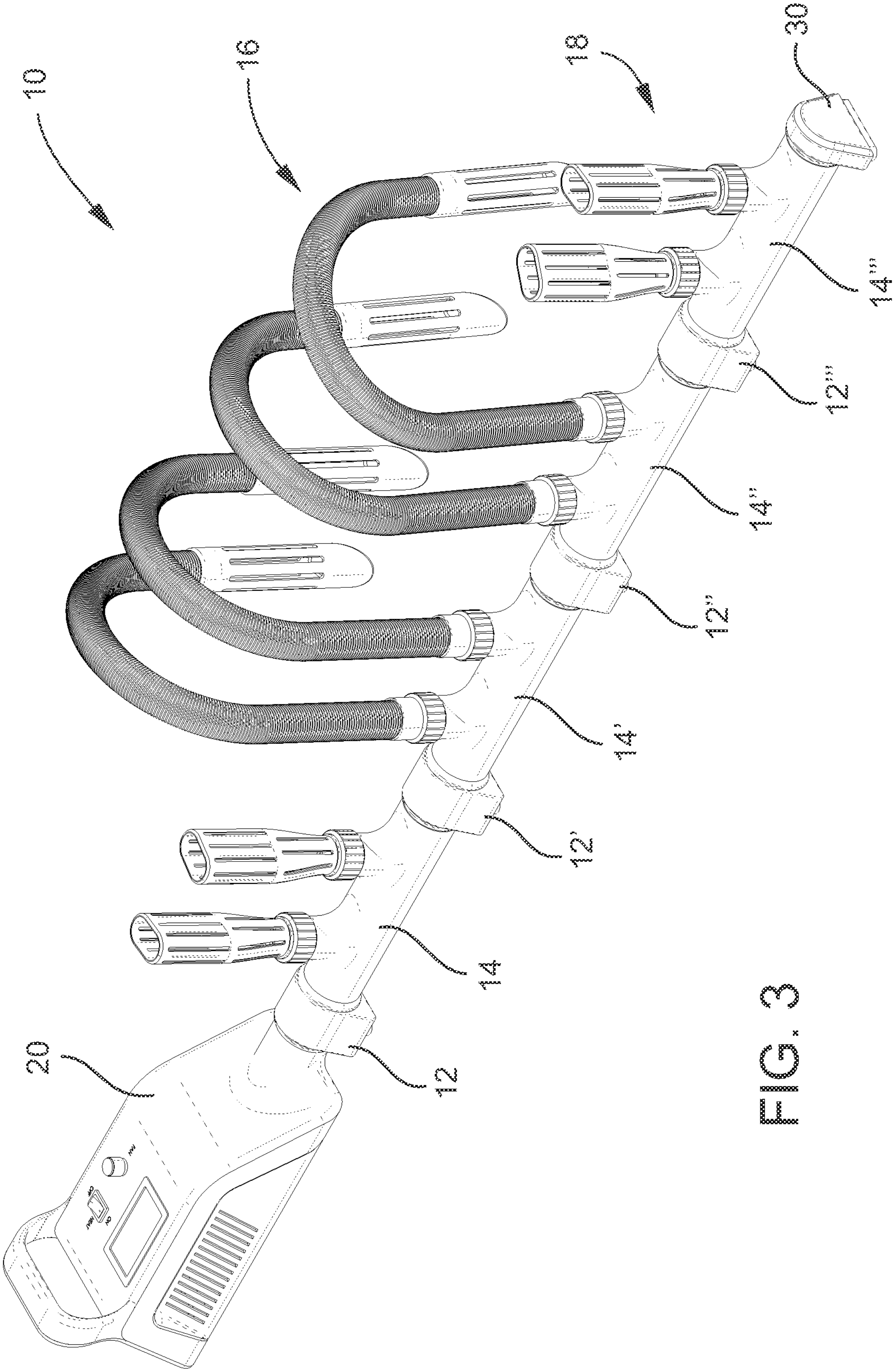
FIG. 3 is a perspective view of an exemplary embodiment of the portable dryer device and fan unit of the present invention.
Figure 4:
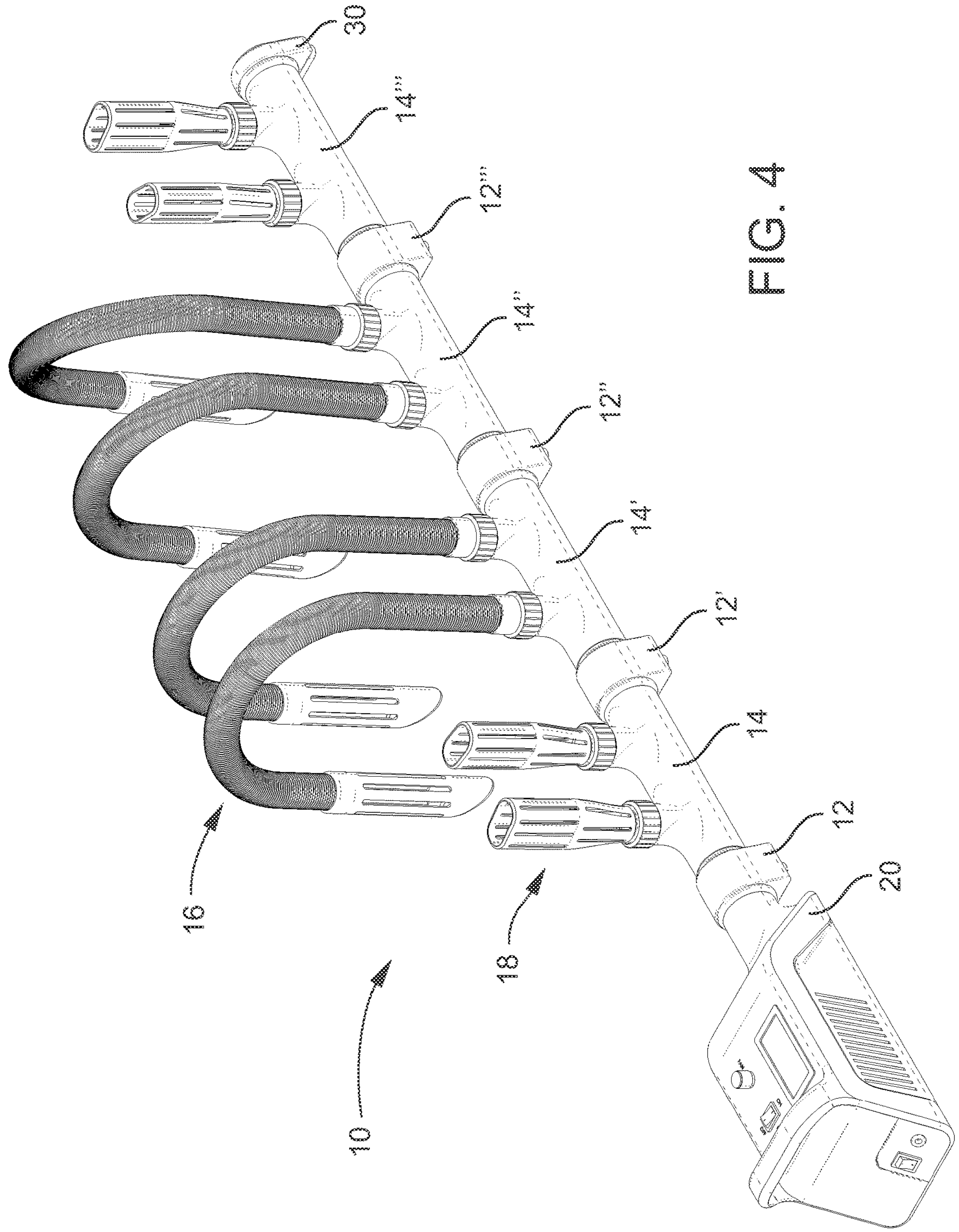
FIG. 4 is a perspective view of an exemplary embodiment of the portable dryer device and fan unit of the present invention.

A dryer apparatus may be engaged to the drying manifold 14. The dryer apparatus is an apparatus engaged to an outlet of the drying manifold 14 to dry various items or articles as set forth herein, including, but not limited to, apparel, garments, personal items, accessories, and the like. The dryer apparatus may have many forms adapted to efficiently and effectively dry the apparel, garments, personal items, accessories and the like. The dryer apparatus is designed to receive apparel, such as a glove, boot, shoes, cleats, waders, helmet, goggles shirt, jacket, pants, hats, and the like, for drying these items. The dryer apparatus may also receive items that are not considered apparel, such as bags, sacks, and the like, for drying these items. The dryer apparatus may be a boot dryer attachment 16 and/or a glove/shoe dryer attachment 18 as illustrated in FIGS. 1 and 2. However, any type of dryer attachment may be utilized to dry a variety of items. The boot dryer attachment 16 and glove/shoe dryer attachment 18 may be engaged to the drying manifold 14 in any combination, specifically engaged to the second portion or third portion of the drying manifold 14, for allowing drying air to exit the outlet in the second portion or third portion, entering the boot dryer attachment 16 or glove/shoe dryer attachment 18.

The boot dryer attachment 16 contains a first end and a second end. The first end contains an adaptor portion 22 engaged to a hose portion 24. The adaptor portion 22 is generally circular and hollow, allowing drying air to proceed through the adaptor portion 22 unencumbered. The adaptor portion 22, while illustrated and described as circular, may be any shape and not limited to a circular shape. The first side of the adaptor portion 22 is selectively secured to the drying manifold 14, and more specifically, the adaptor portion 22 is selectively secured to the second portion or the third portion of the drying manifold 14. The adaptor portion 22 has a diameter slightly larger than the diameter of the opening within the second portion or the third portion, allowing the opening of the second portion or third portion to be received within the first side of the adaptor portion 22 and selectively secured therein by friction fit. Alternatively, the adaptor portion 22 may be internally threaded for receiving corresponding external threads around the opening of the second portion and third portion for selectively securing the adaptor portion 22 to the drying manifold 14. The second side of the adaptor portion 22 is engaged to a proximal end of the hose portion 24. The distal end of the hose portion 24 is engaged to a boot insertion portion 26.

The hose portion 24 is generally a flexible, elongate, hollow hose or tube that allows air to flow from the drying manifold 14 and adaptor portion 22 through the hose portion 24. The hose portion 24 may be corrugated and contain ridges. In one embodiment, the hose portion 24 may include a structural element, such as a wire or resiliently flexible plastic that is engaged to the exterior of the hose portion 24, engaged to the interior of the hose portion 24, or formed within the hose portion 24 itself to provide additional structure and support to the hose portion 24. The distal end of the hose portion 24 is engaged to the boot insertion portion 26, designed to be inserted into a boot or the like. The boot insertion portion 26 is preferably a rigid tubular structure that has a tapered outlet, allowing the drying air to exit the boot insertion portion 26 and enter a boot. The side walls of the boot insertion portion 26 contain at least one slit, two or more slits, or a plurality of slits extending from the exterior surface to the interior surface, for allowing the drying air to flow through the slits.

The glove/shoe: dryer attachment 18 contains an adaptor portion 22 on its proximal end. The adaptor portion 22 may be integral with the glove/shoe dryer attachment 18 or selectively secured to the glove/shoe dryer attachment 18. The adaptor portion 22 is designed to engage the second portion and third portion of the drying manifold 14. The adaptor portion 22 is generally circular and hollow, allowing drying air to proceed through the adaptor portion 22 unencumbered. The adaptor portion 22, while illustrated and described as circular, may be any shape and not limited to a circular shape. The adaptor portion 22 is selectively secured to the drying manifold 14, and more specifically, the adaptor portion 22 is selectively secured to the second portion or the third portion of the drying manifold 14. The adaptor portion 22 has a diameter slightly larger than the diameter of the outlet within the second portion or the third portion, allowing the outlet of the second portion or third portion to be received within the adaptor portion 22 and selectively secured therein by friction fit. Alternatively, the adaptor portion 22 may be internally threaded for receiving corresponding external threads around the opening of the second portion and third portion for selectively securing the adaptor portion 22 to the drying manifold 14.

The glove/shoe dryer attachment 18 contains a tapered portion that extends outwards from the adaptor portion 22. In other words, the width of the tapered portion increases as it extends from the adaptor portion 22 to an end portion that is generally oval with a constant diameter. The glove/shoe dryer attachment 18 may also be any configuration, such as circular, conical, rectangular, or the like, that can dry a glove or shoe. The glove/shoe dryer attachment 18 contains an opening in the end portion, allowing the drying air to exit the glove/shoe dryer attachment 18. During use, a glove or a variety of shoe styles is placed over the end portion of the glove/shoe dryer attachment 18 and drying air is blown into the glove for drying. The glove/shoe dryer attachment 18 may also contain at least one slit, two or more slits, or a plurality of slits on the sides that extend from the external surface to the internal surface for allowing drying air to proceed through the slits for drying a glove.

Figure 7:
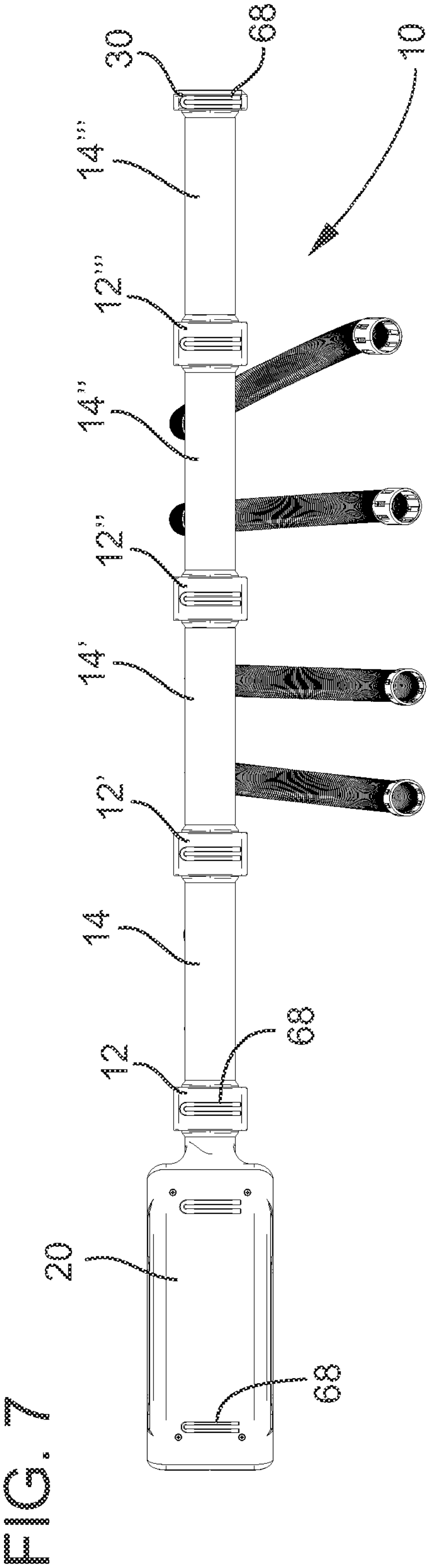
FIG. 7 is a bottom view of an exemplary embodiment of the portable dryer device and fan unit of the present invention.
Figure 8:
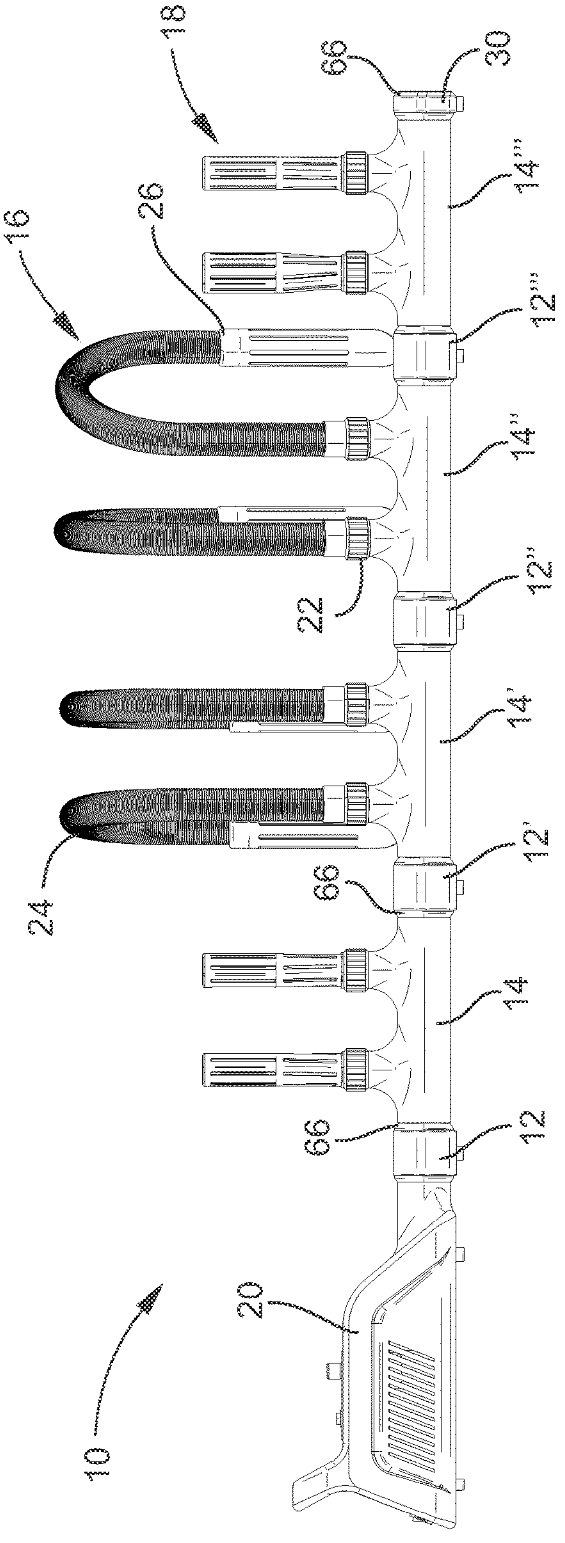
FIG. 8 is a side view of an exemplary embodiment of the portable dryer device and fan unit of the present invention.
Figure 9:
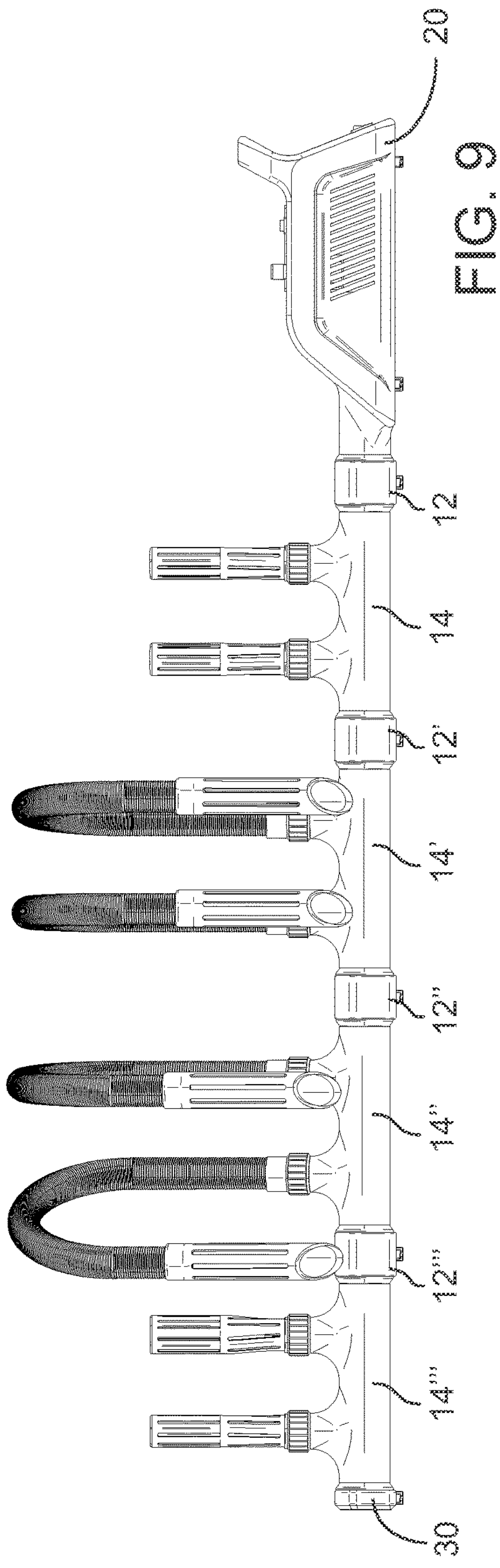
FIG. 9 is a side view of an exemplary embodiment of the portable dryer device and fan unit of the present invention.
Figure 10:
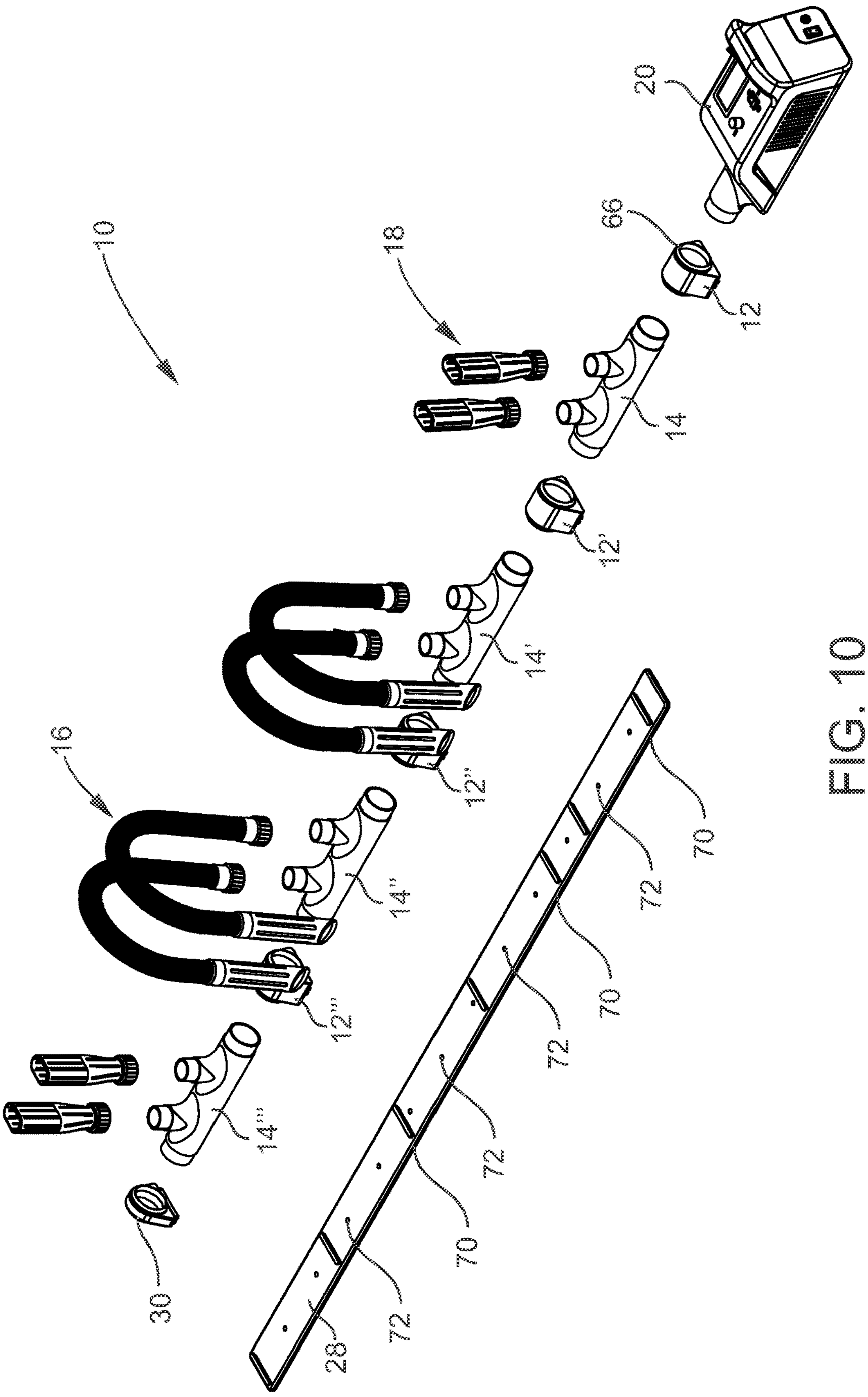
FIG. 10 is an exploded view of an exemplary embodiment of the portable dryer device and fan unit of the present invention and mounting apparatus.
Figure 11:
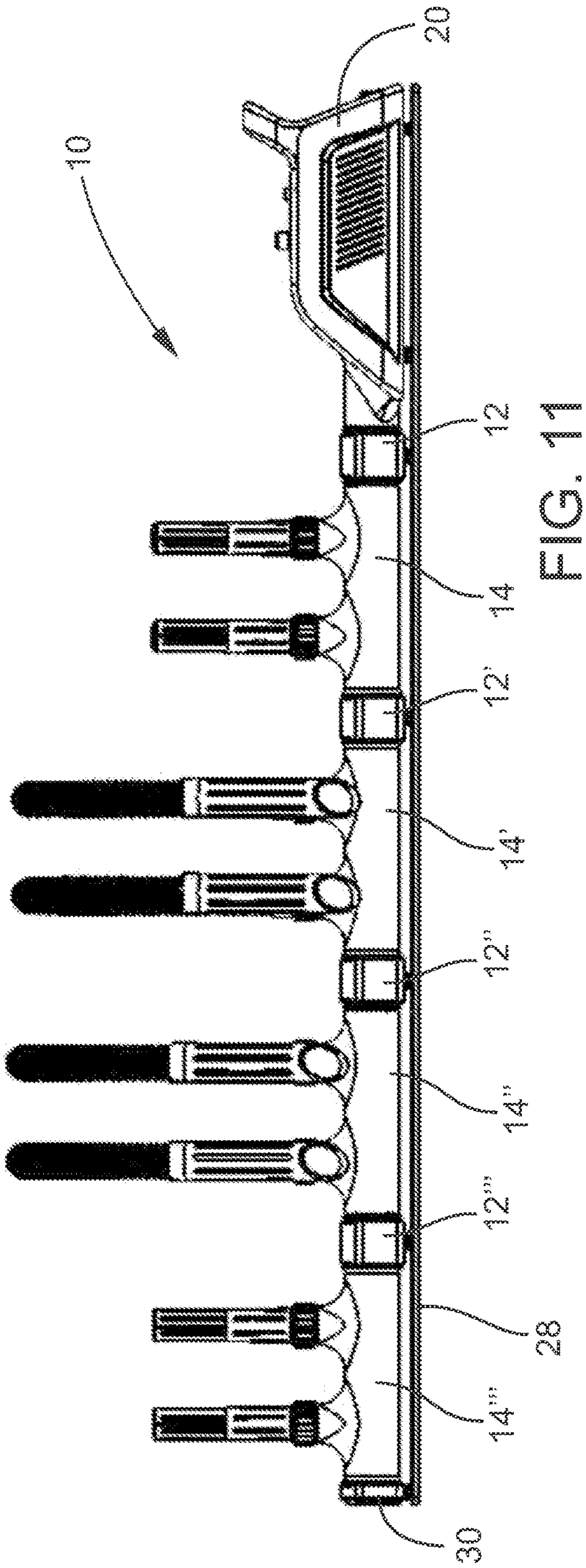
FIG. 11 is a side view of an exemplary embodiment of the portable dryer device and fan unit of the present invention engaged to the mounting apparatus.
Figure 12:
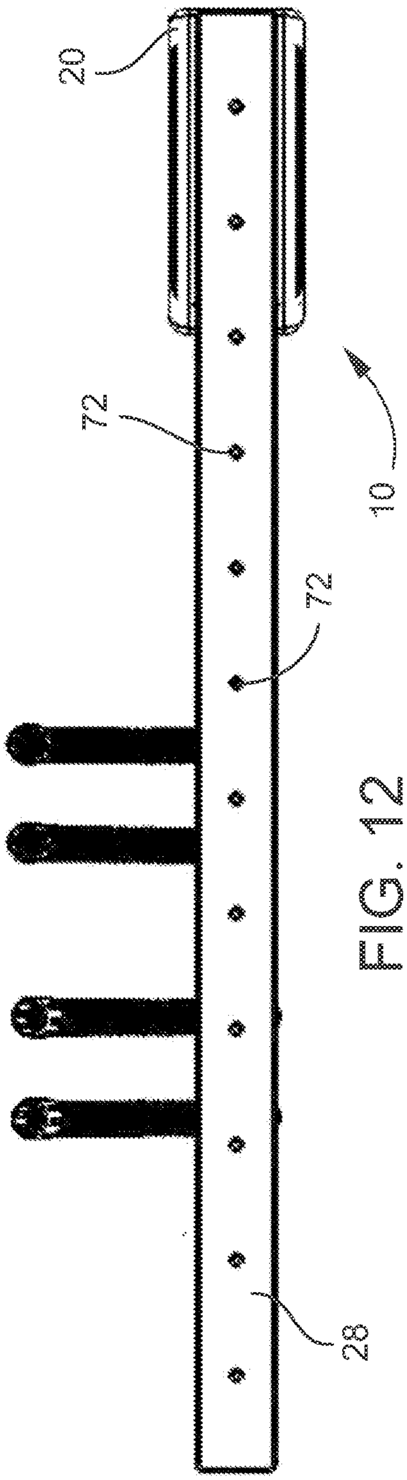
FIG. 12 is a bottom view of an exemplary embodiment of the portable dryer device and fan unit of the present invention engaged to the mounting apparatus.
Figure 13:
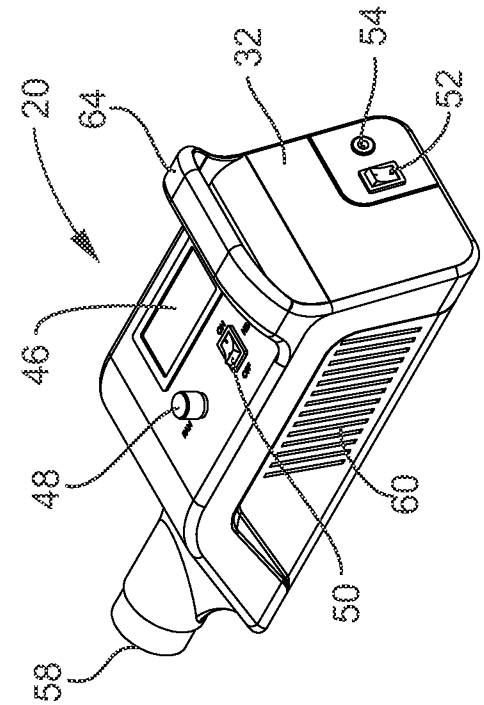
FIG. 13 is a perspective view of the fan unit of the present invention.
Figure 14:
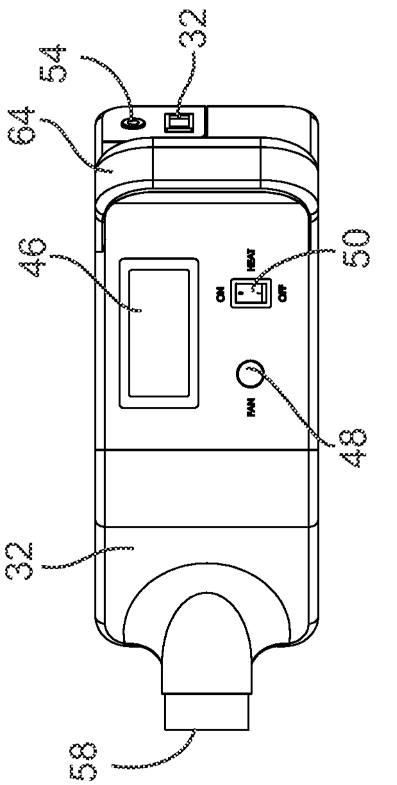
FIG. 14 is a top view of the fan unit of the present invention.
Figure 15:
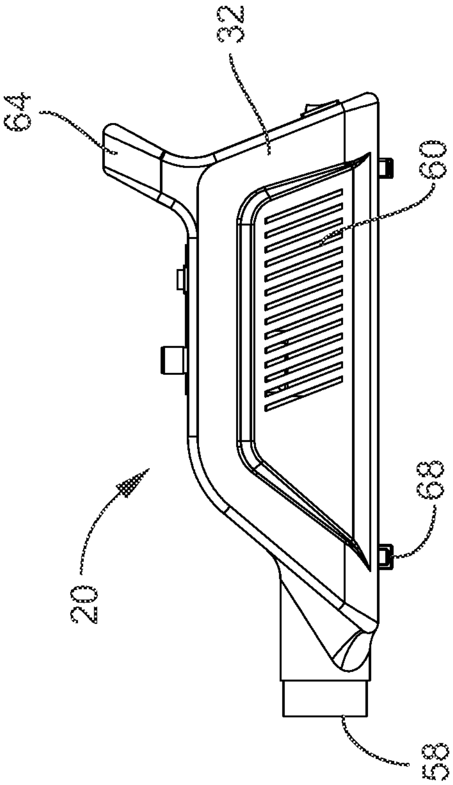
FIG. 15 is a side view of the fan unit of the present invention.
Figure 16:
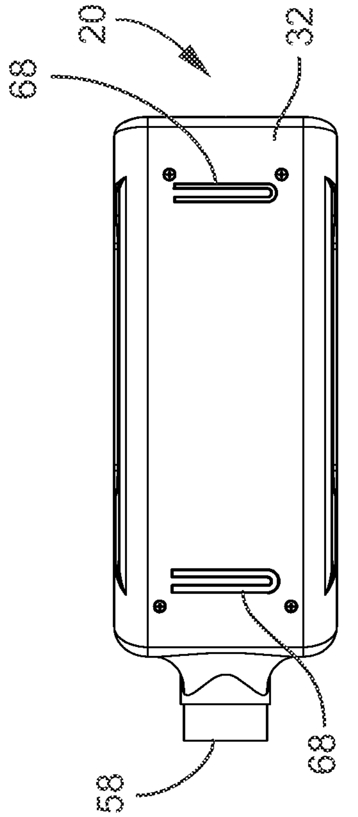
FIG. 16 is a bottom view of the fan unit of the present invention.
Figure 17:
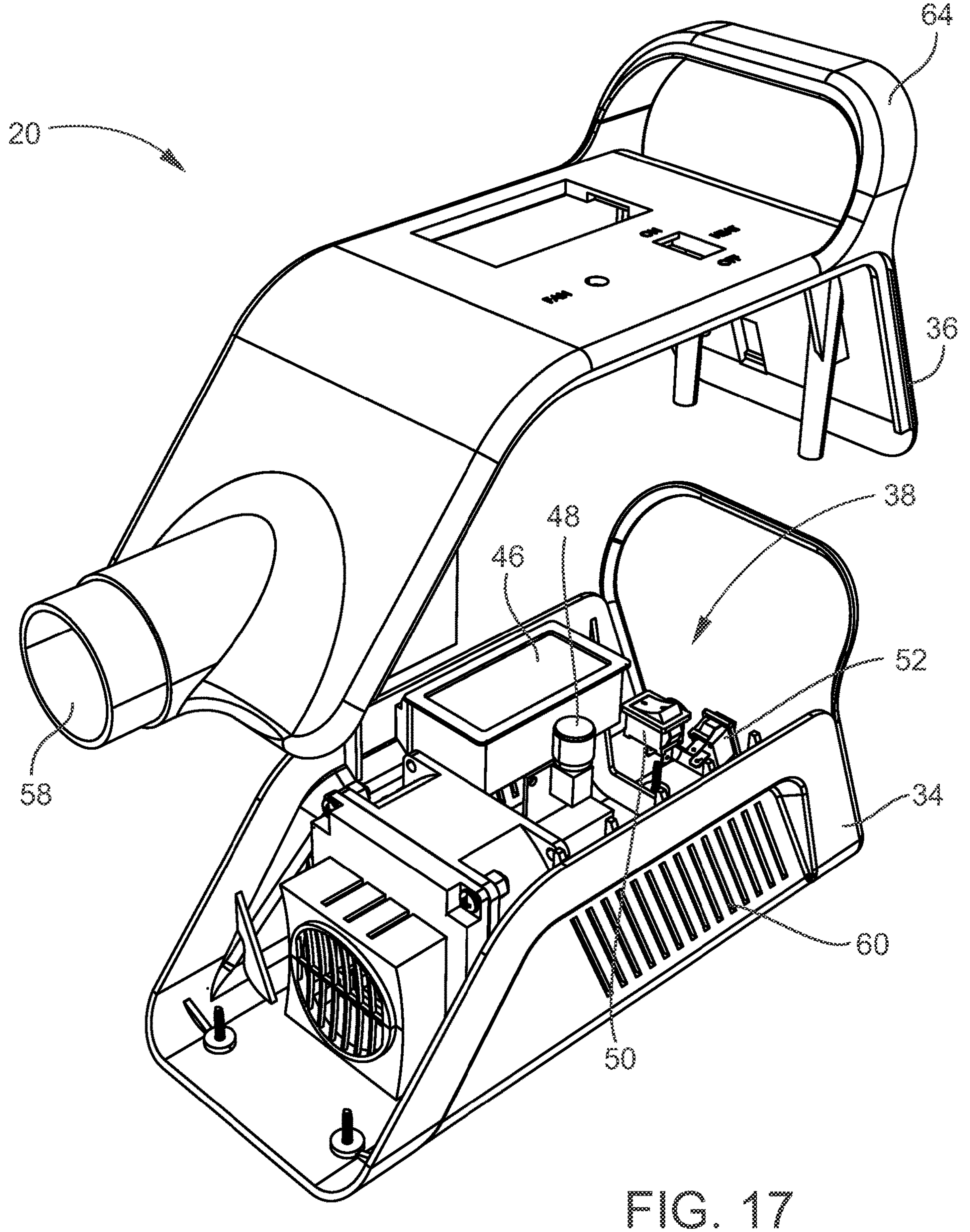
FIG. 17 is a perspective view of the fan unit of the present invention with the top portion of the housing removed.
Figure 29:
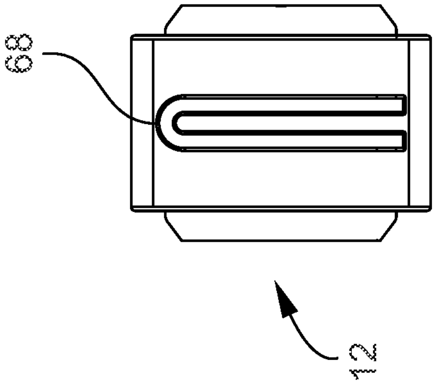
FIG. 29 is a bottom view of an exemplary embodiment of the coupler device.
Figure 30:
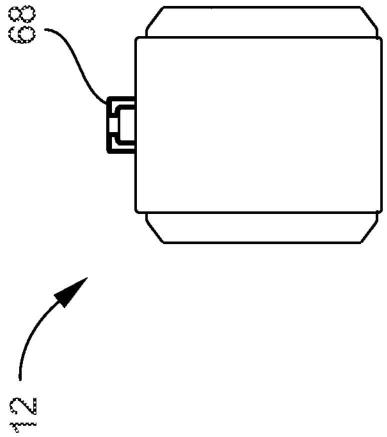
FIG. 30 is a side view of an exemplary embodiment of the coupler device.
Figure 31:
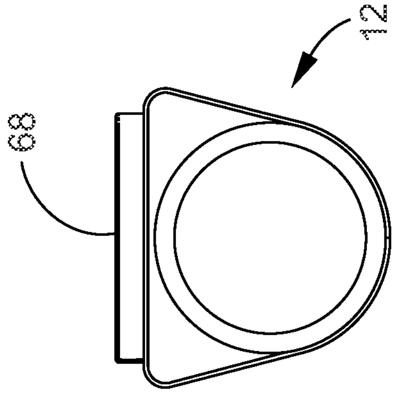
FIG. 31 is a front view of an exemplary embodiment of the coupler device.
Figure 32:
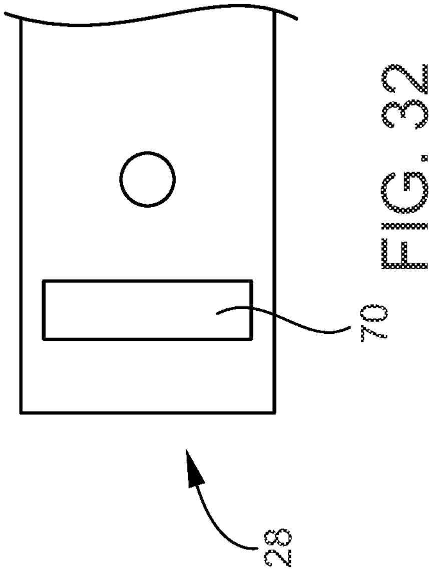
FIG. 32 is a top view of an exemplary embodiment of the mounting apparatus.
Figure 33:
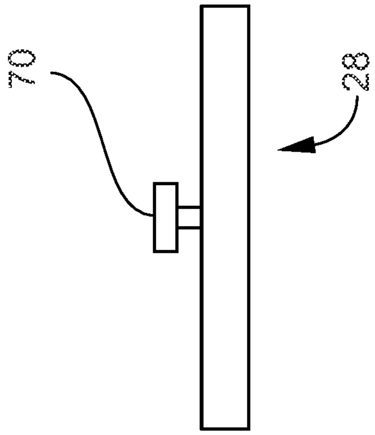
FIG. 33 is a side view of an exemplary embodiment of the mounting apparatus.
Figure 34:
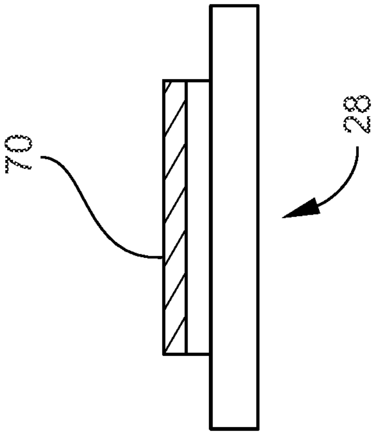
FIG. 34 is a front view of an exemplary embodiment of the mounting apparatus.

The dryer device 10 may also have a mounting apparatus 28 for mounting the dryer device 10 on a wall or the like. The mounting apparatus 28 is an elongated bar that contains a number of ribs 70, as illustrated in FIGS. 10-12. The back side of each coupler device 12, each drying manifold 14, the end piece 30 and the fan unit 20 contain a mounting member 68. As illustrated in FIG. 29, the mounting member 68 is "U-shaped" In this embodiment, the mounting member 68 has an opening and two, spaced-apart side portions that extend away from the opening, parallel to each other, to an arcuate bottom member engaged to each side portion. The interior surface of the two, spaced-apart side portions and interior surface of the arcuate bottom member define a channel. The two, spaced-apart side portions and arcuate bottom member extend downwardly from the bottom surface of the coupler device 12, as shown in FIGS. 30 and 31. While a coupler device is illustrated in FIGS. 29, 30, and 31, the mounting member 68 has the same structure on the bottom surface of the fan unit 20 and/or bottom surface of the end piece 30. A collar extends outwardly from the bottom of each side portion. The collar extends into the channel along the length of each side portion. The mounting member 68 is designed to engage a rib 70 on the mounting apparatus. The rib 70, as illustrated in FIGS. 32-34, preferably is "T-shaped" that includes an elongate portion and two wings extending outwardly from the elongate portion. The first part of the elongate portion of the rib 70 is engaged to the surface of the mounting member 68 and extends upwardly from surface of the mounting member 68 to the second part of the elongate portion. Two wings extend outwardly from the second part of the elongate portion in opposite directions. The two wings and elongate portion collectively provide the "T-shape." The rib 70 is positioned within the channel of the mounting member 68 selectively securing the components of the dryer device 10 to the mounting apparatus 28. During this process, a rib 70 on the mounting apparatus 28 is inserted into the opening of the mounting member 68 and the channel. The wings extending outwardly from the second part of the elongate portion are positioned between the collar of the two side portions of the mounting member 68, extending into the channel, and the bottom surface of the particular component the mounting member is engaged (e.g. the fan unit 20, bottom surface of the coupler device 12, and/or bottom surface of the end piece 30, as shown in FIG. 7). The channel is slid along the length of the rib 70, until an end of the rib 70 contacts the arcuate bottom member of the mounting member 68, selectively securing the mounting member 68 to the rib of the mounting apparatus 68, which selectively secures the coupler device 12, drying manifold 14, end piece 30, or fan unit 20 containing the mounting member 68 to the mounting apparatus 28. In this arrangement, the wings of the rib 70 are engaged to the collar of each side portion of the mounting apparatus 28.

The mounting apparatus 28 is pre-measured for the mounting member 68 and channels contained within each mounting member 68 on the back of the components (coupler device 12, drying manifold 14, end piece 30, or fan unit 20) of the dryer device 10 to allow for easy installation and removal. The mounting apparatus 28 is engaged to a wall or the like by attachment devices, such as a screw, bolt, adhesive, or the like. The mounting apparatus 28 contains at least two bores 72 that proceed from the front surface to the back surface for receiving an attachment device, such as a screw, bolt, or the like. The back surface is placed adjacent a surface, such as a wall, for mounting or engaging the mounting apparatus 28. The attachment device, such as a screw, bolt, or the like, is inserted through the at least two bores 72 and engaged to the adjacent surface, such as a wall, mounting or engaging the mounting apparatus 28 to the surface.

As illustrated, a second drying manifold 14', third drying manifold 14'', fourth drying manifold 14''', etc. may be engaged to the first drying manifold 14. The portable dryer device 10 is modular, consisting of two or more coupler devices 12, two or more drying manifolds 14, and/or two or more dryer apparatuses (boot dryer attachment 16 and/or glove/shoe dryer attachment 18). In this arrangement, two or more coupler devices (12, 12', 12'', 12''', etc.) are utilized to connect each drying manifold (14, 14', 14'', 14''', etc.). As illustrated, the second end of the first drying manifold 14 is inserted into the opening of the passageway in the first end of the second coupler device 12' and the first end of the second drying manifold 14' is inserted into the opening of the passageway in the second end of the second coupler device 12', connecting the first drying manifold 12 to the second drying manifold 14'. The second end of the second drying manifold 14' is inserted into the opening of the passageway of the first end of the third coupler device 12'' and the first end of the third drying manifold 14'' is inserted into the opening of the passageway of the second end of the third coupler device 12''. The second end of the third drying manifold 14'' is inserted into the opening of the passageway of the first end of the fourth coupler device 12''', and the first end of the fourth drying manifold 14''' is inserted into the opening of the passageway of the second end of the fourth coupler device 12''', connecting the third drying manifold 14'' to the fourth drying manifold 14'''. The second end of the fourth drying manifold 14''' is enclosed by an end piece 30, preventing the drying air from exiting the device 10.

In operation, the drying air exits the outlet of the fan unit 20 where it proceeds through the hollow interior portions of the drying manifolds (14, 14', 14'', 14''', etc.). A portion of the air is diverted to the second portion and third portion of each drying manifold (14, 14'', 14'', 14''' etc.), wherein the drying air exits the drying manifolds (14, 14'', 14'', 14''' etc.) through the outlet or the outlets in the second portion and the third portion and proceeds through a dryer attachment, such as either a boot dryer attachment 16 or a glove/shoe dryer attachment 18 for drying a boot, glove, or the like.

Figure 18:
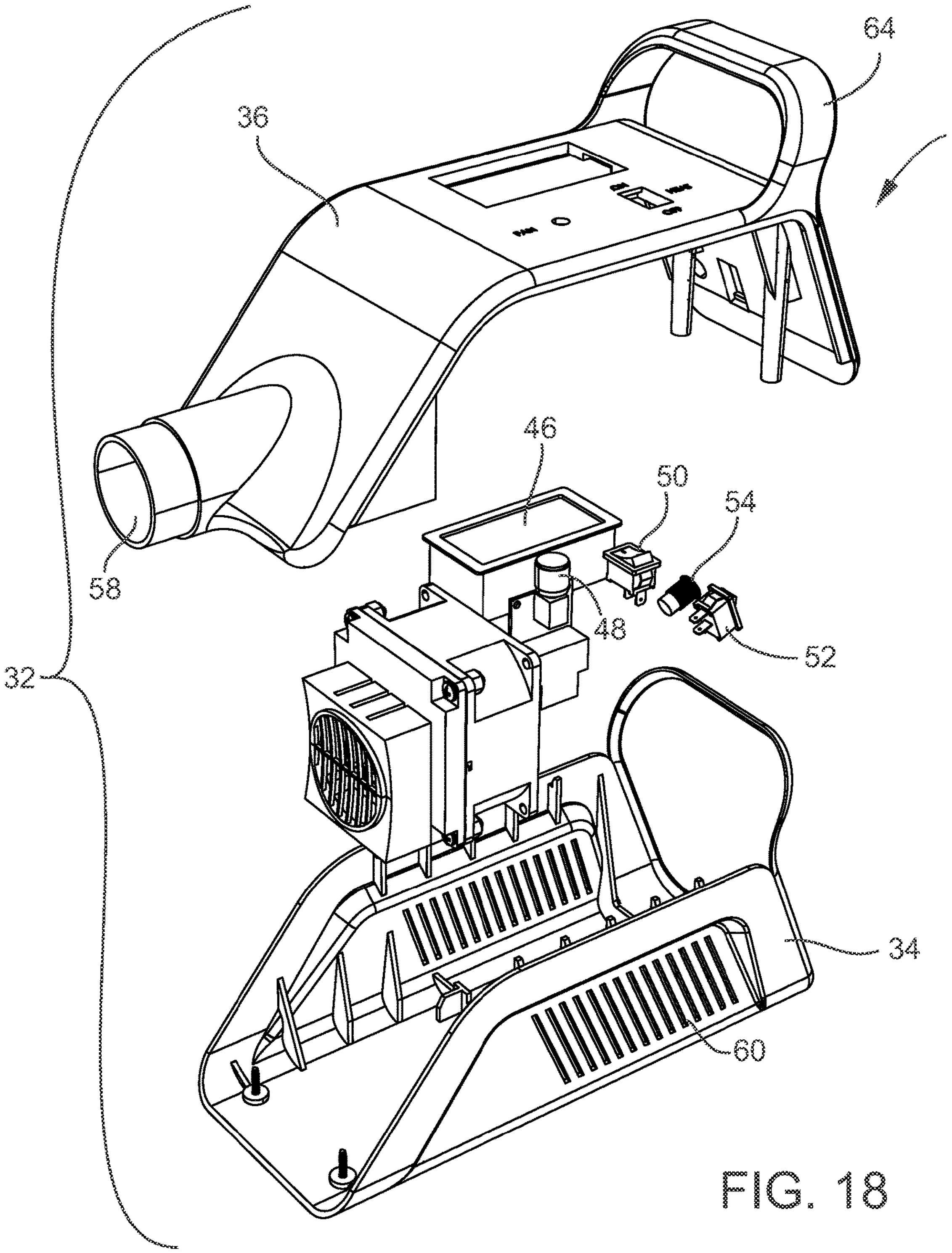
FIG. 18 is an exploded view of the fan unit of the present invention.
Figure 19:
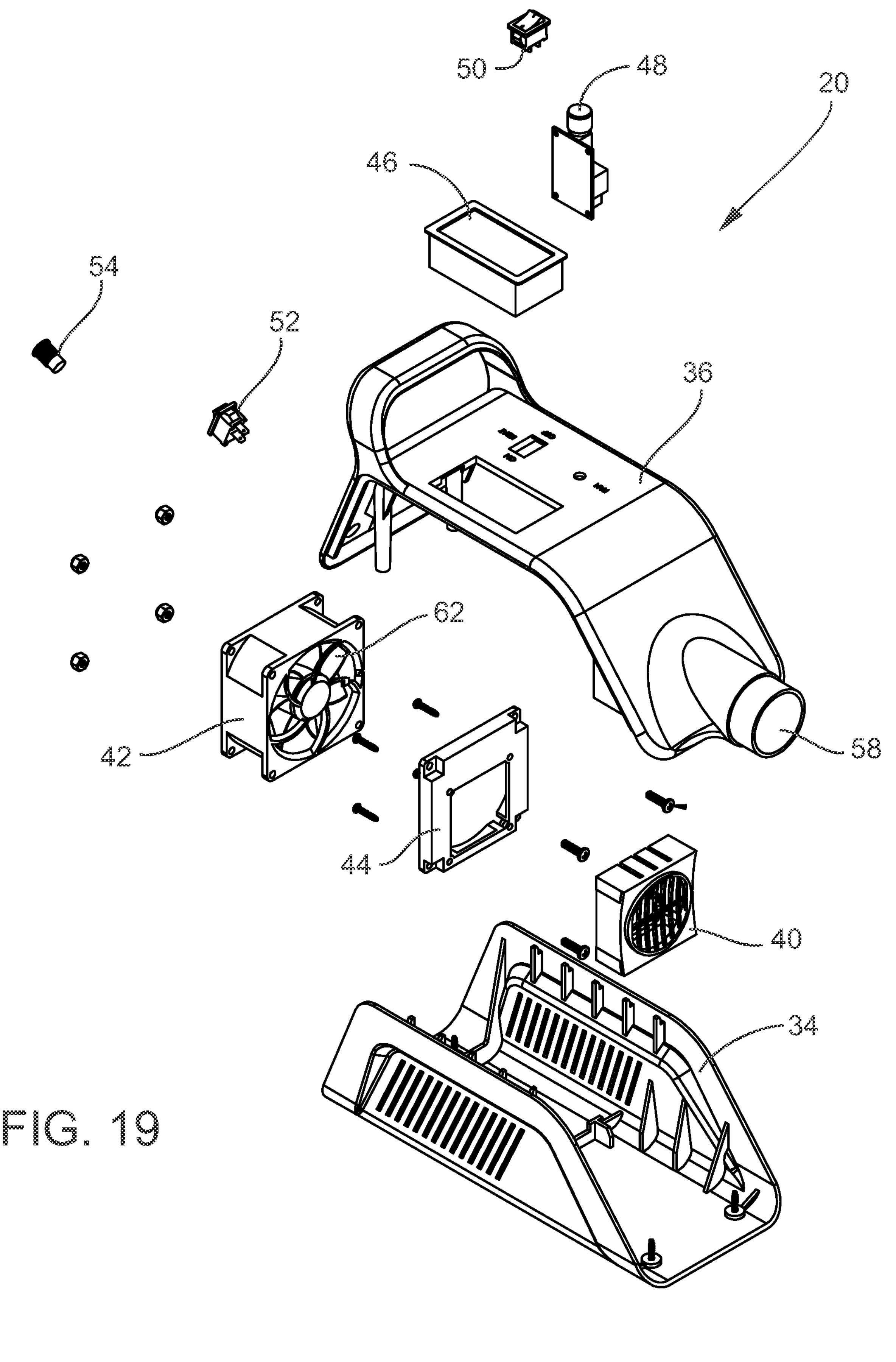
FIG. 19 is an exploded view of the fan unit of the present invention.
Figure 20:
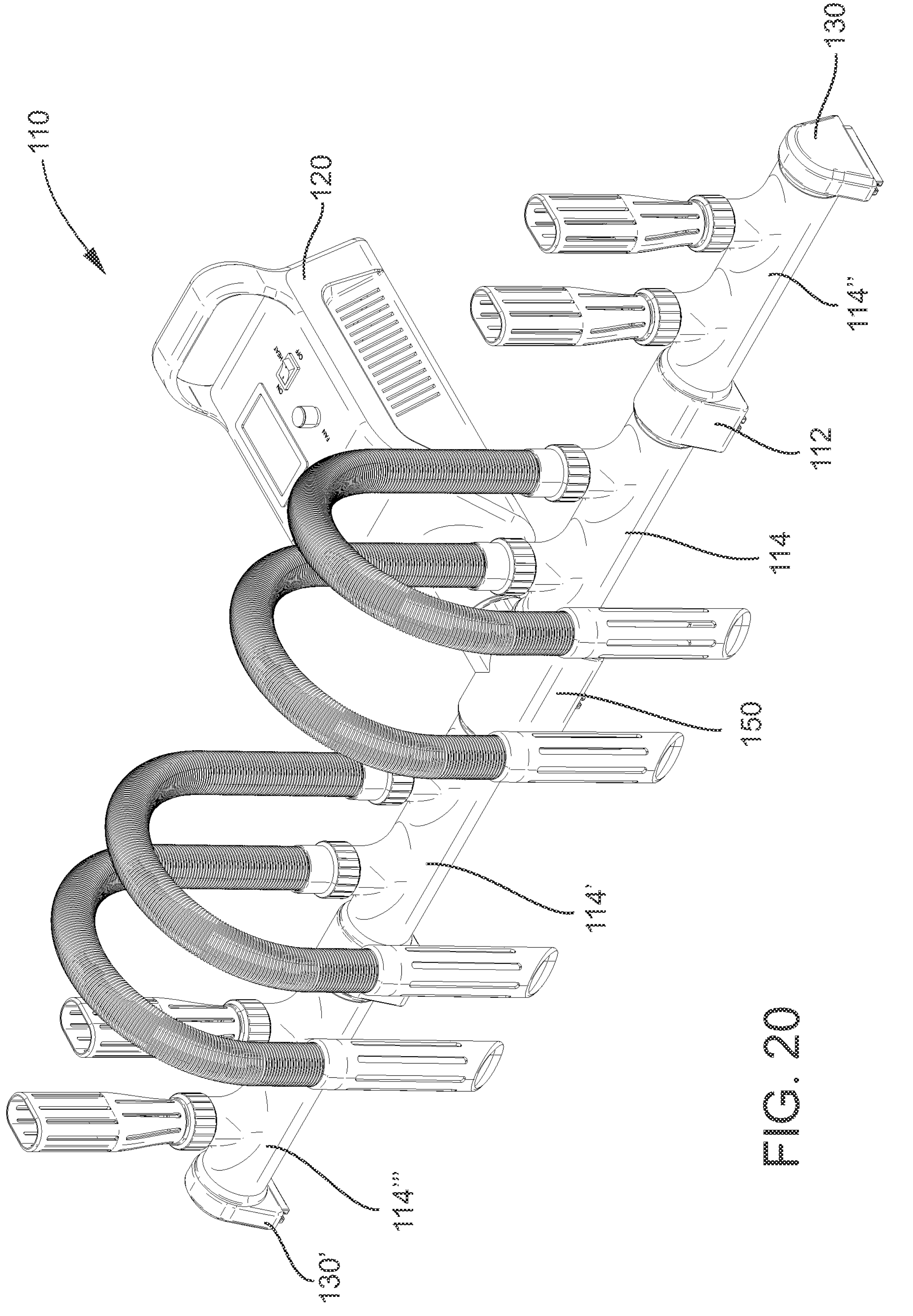
FIG. 20 is a perspective view of an alternative exemplary embodiment of the portable dryer device and fan unit of the present invention.
Figure 21:
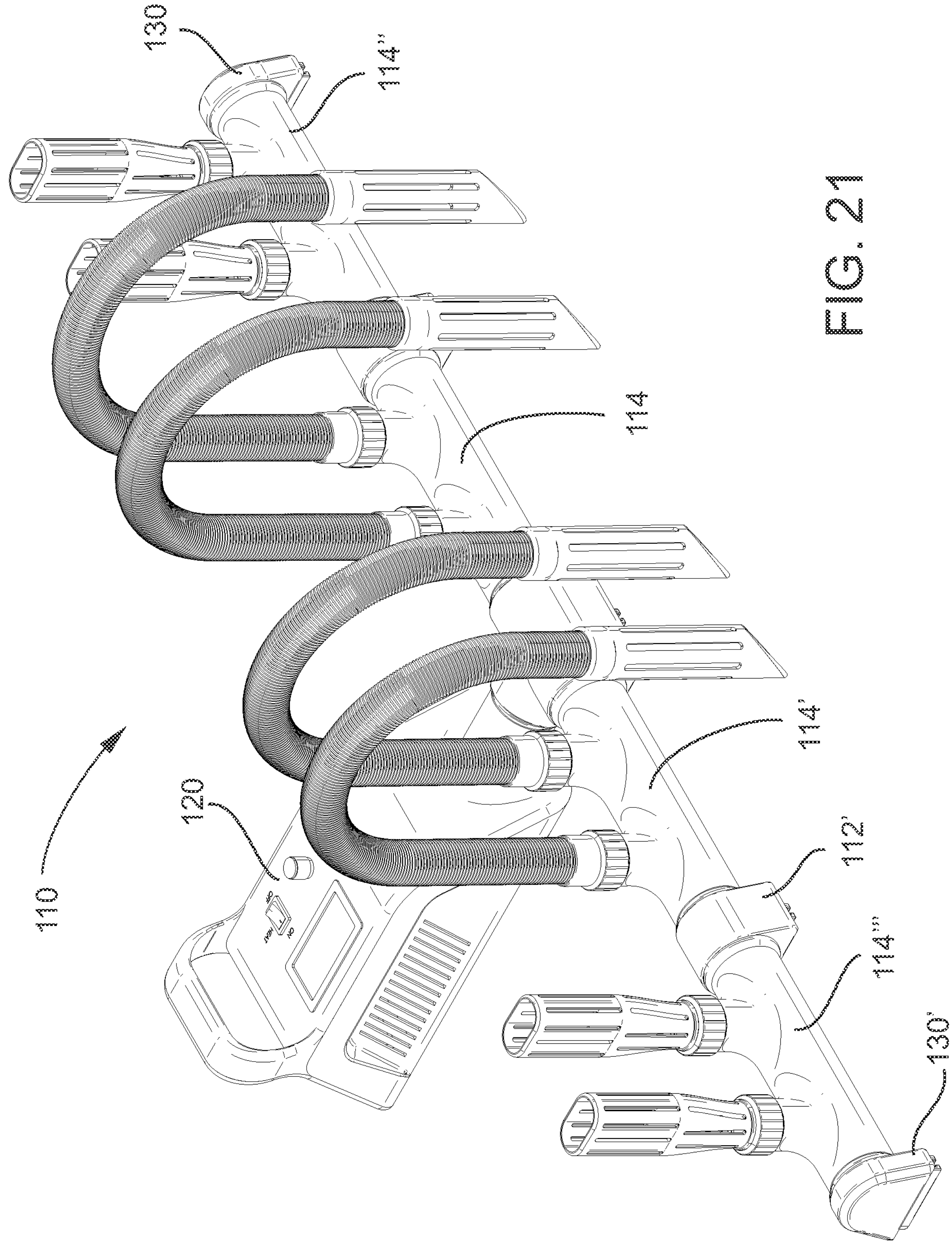
FIG. 21 is a perspective view of an alternative exemplary embodiment of the portable dryer device and fan unit of the present invention.
Figure 22:
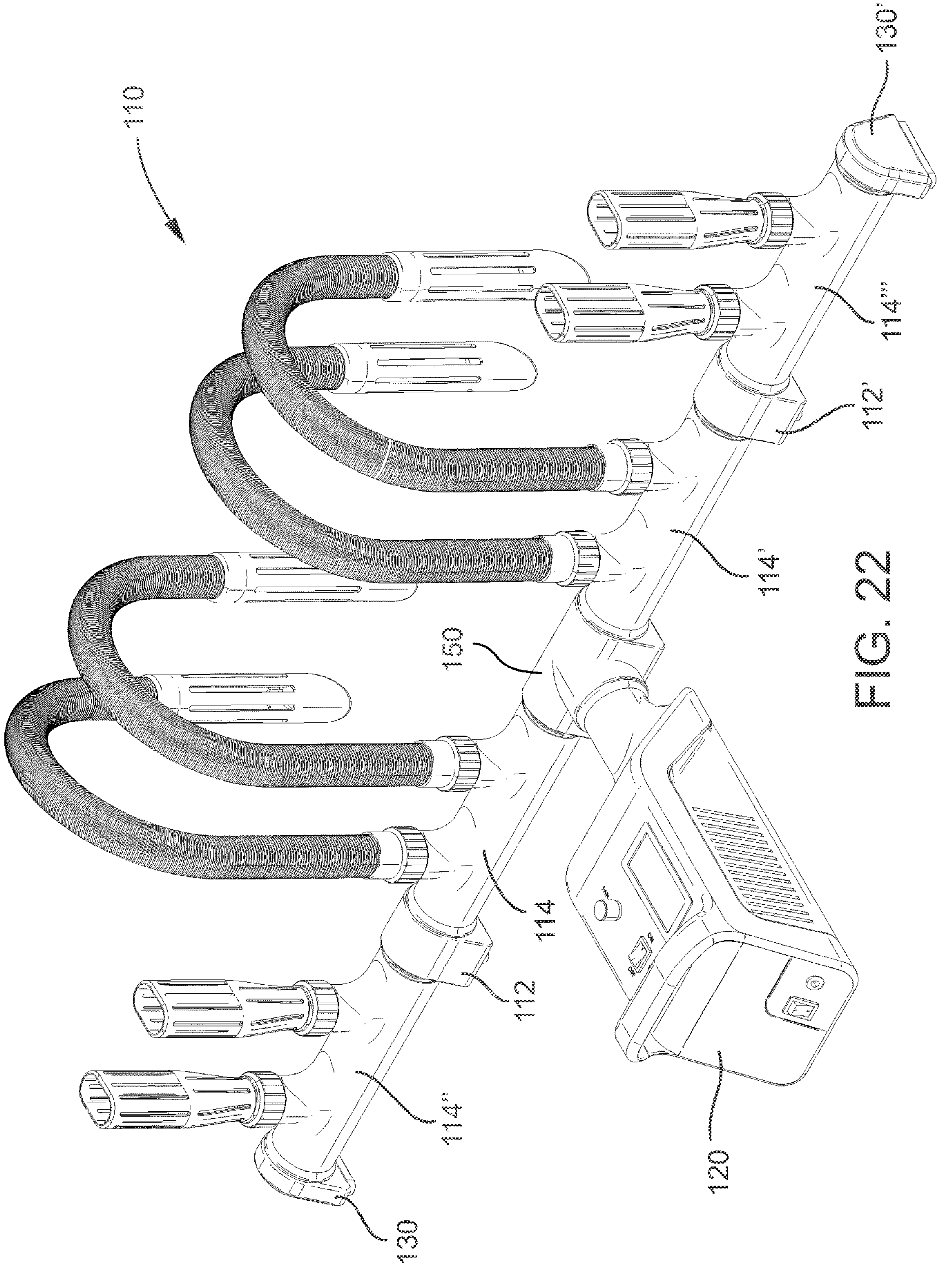
FIG. 22 is a perspective view of an alternative exemplary embodiment of the portable dryer device and fan unit of the present invention.
Figure 23:
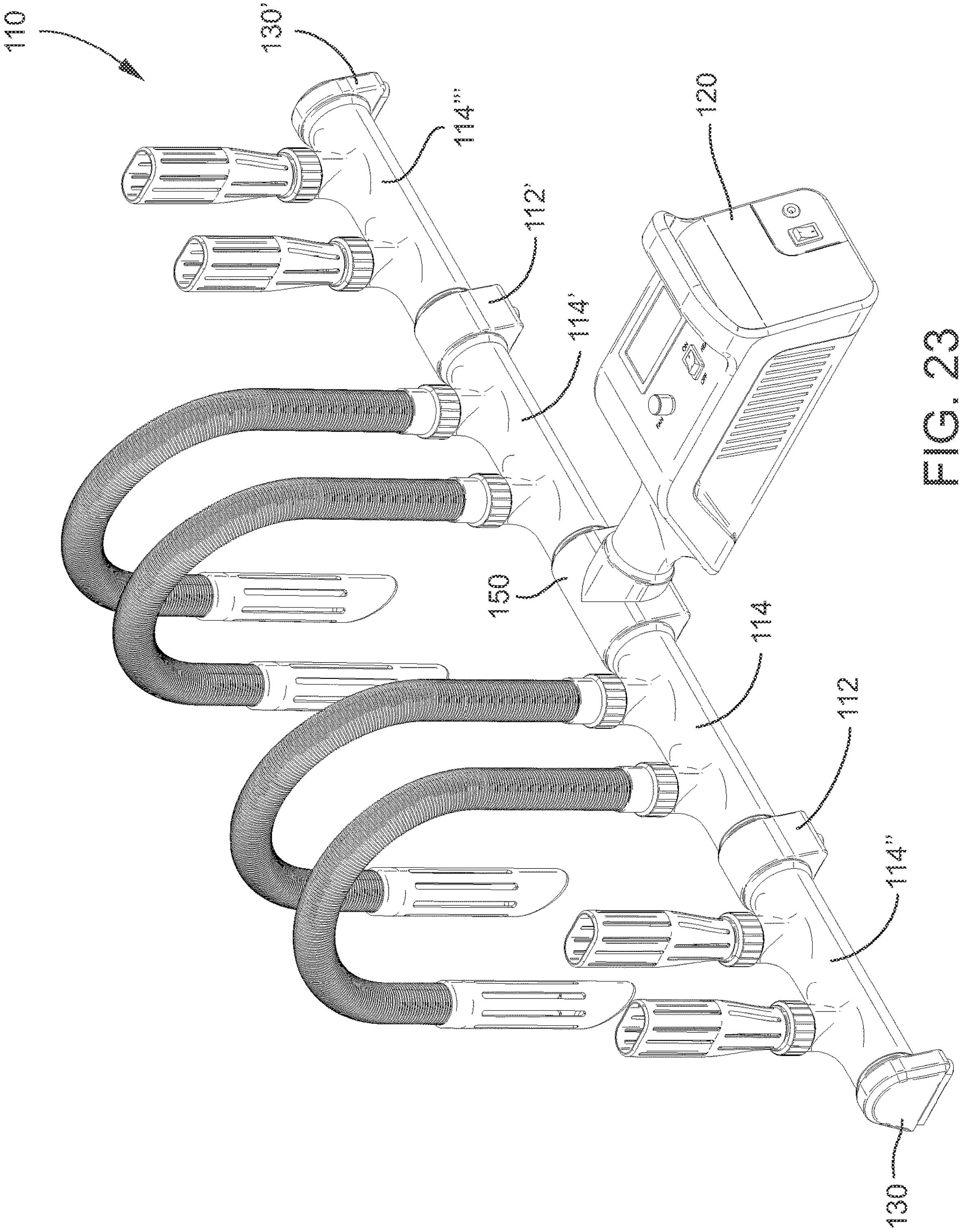
FIG. 23 is a perspective view of an alternative exemplary embodiment of the portable dryer device and fan unit of the present invention.
Figure 24:
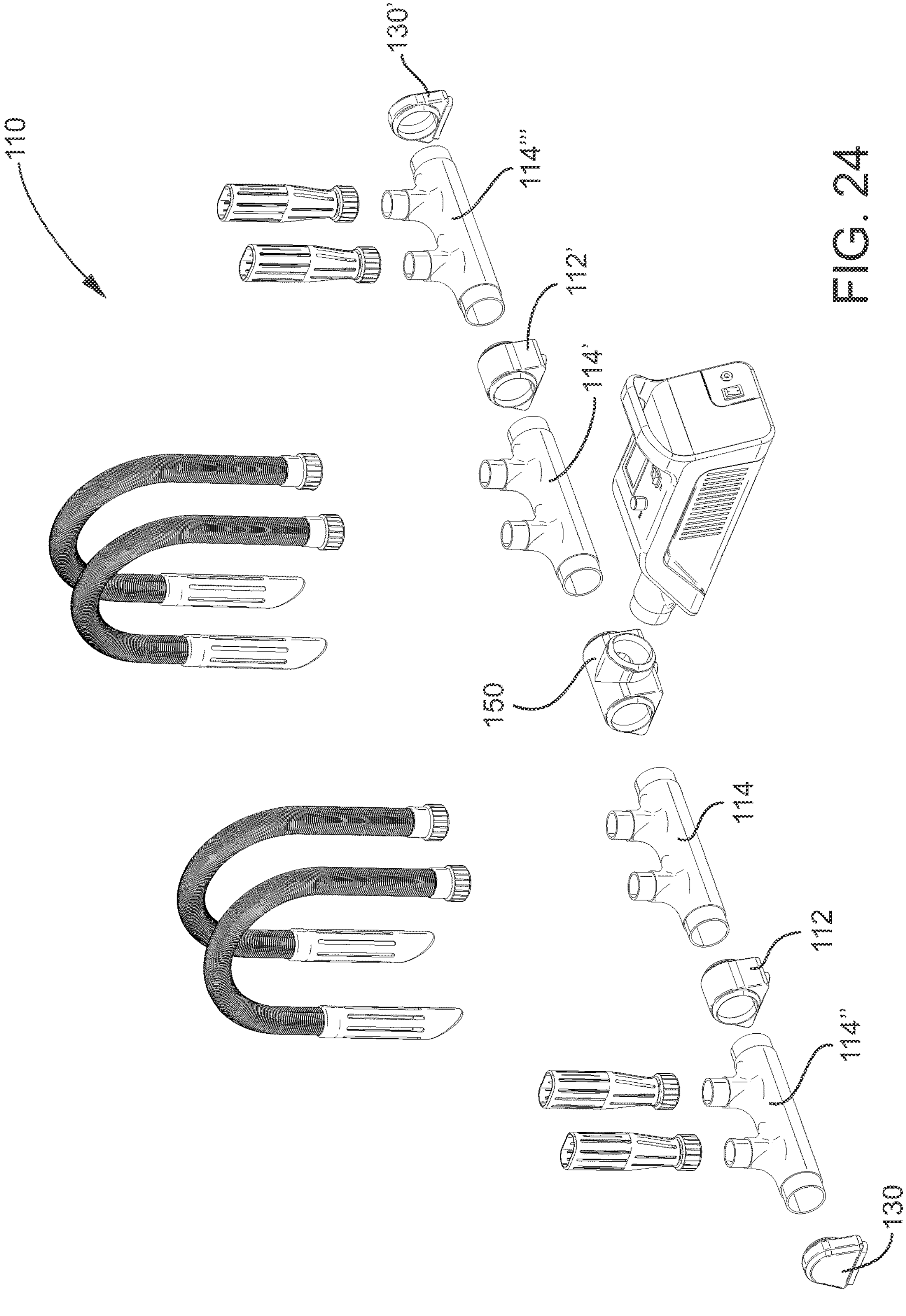
FIG. 24 is an exploded view of an alternative exemplary embodiment of the portable dryer device and fan unit of the present invention.
Figure 25:
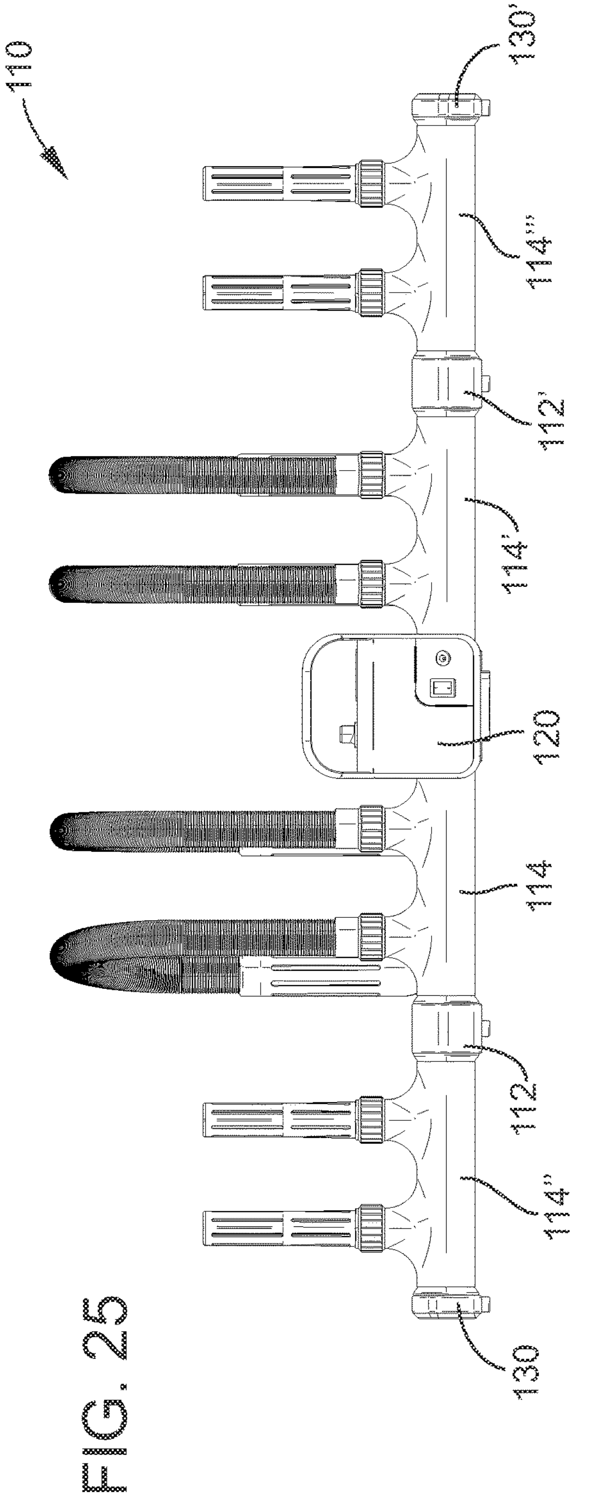
FIG. 25 is a back view of an alternative exemplary embodiment of the portable dryer device and fan unit of the present invention.
Figure 26:
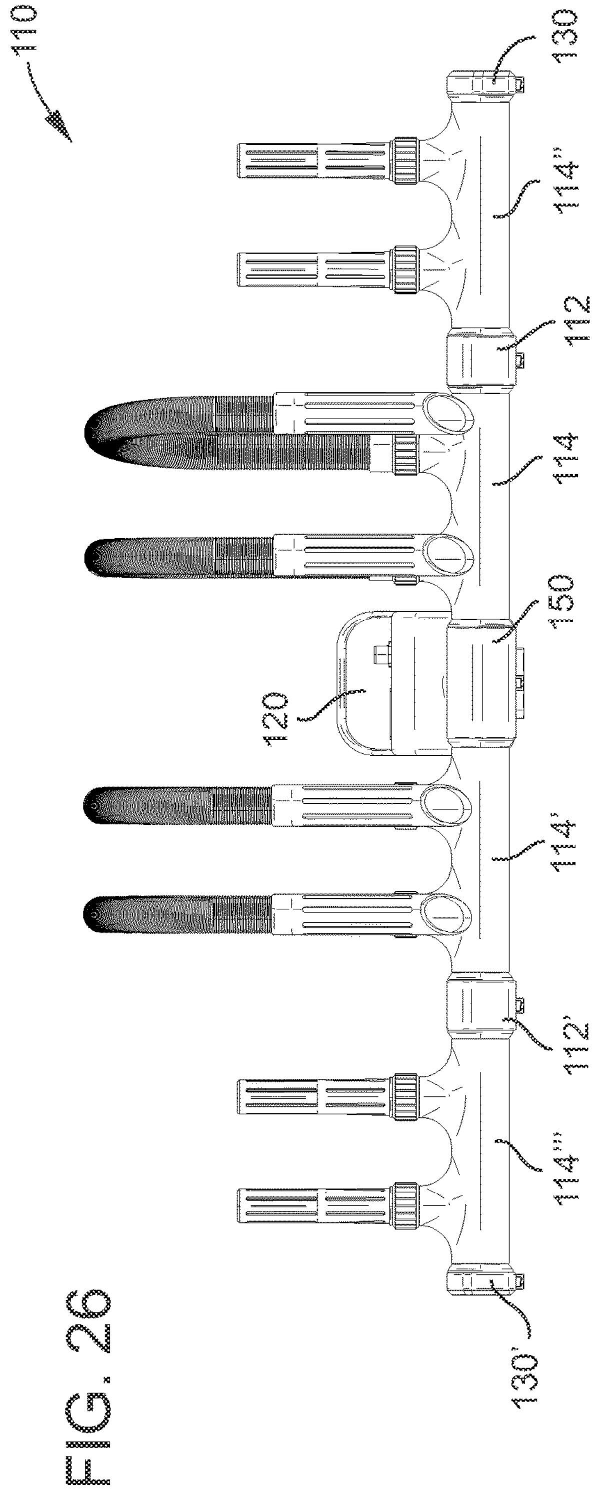
FIG. 26 is a front view of an alternative exemplary embodiment of the portable dryer device and fan unit of the present invention.
Figure 27:
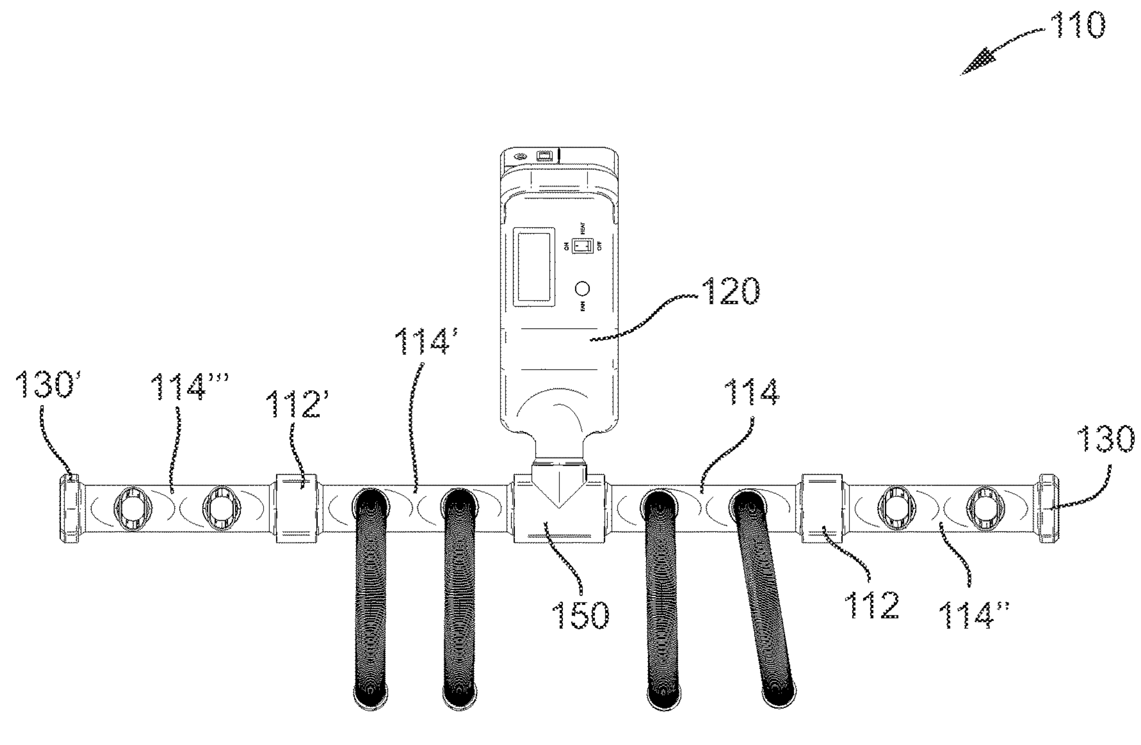
FIG. 27 is a top view of an alternative exemplary embodiment of the portable dryer device and fan unit of the present invention.
Figure 28:
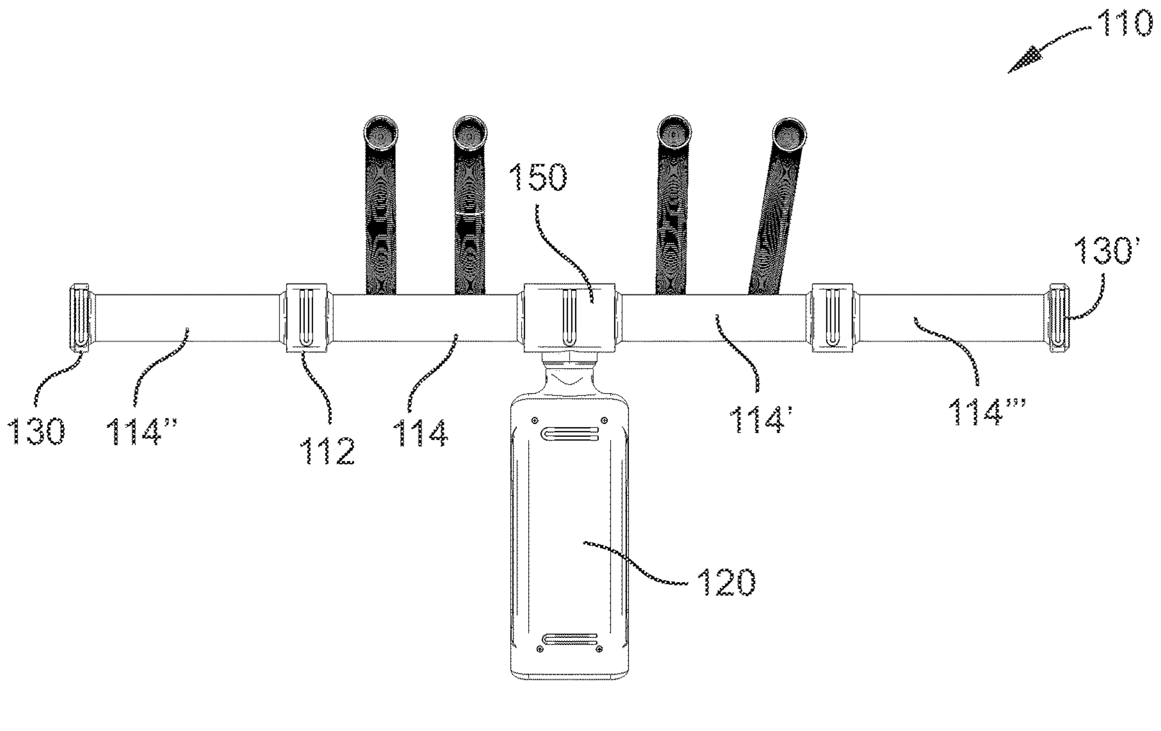
FIG. 28 is a bottom view of an alternative exemplary embodiment of the portable dryer device and fan unit of the present invention.

The fan unit 20 is illustrated in FIGS. 13-19. The fan unit 20 may be composed of a housing 32 that consists of a base portion 34 engaged to a top portion 36 forming a cavity 38 therein. The outlet 58 is disposed on the top portion 36 configured as a generally circular tube-like device extending from the fan unit 20 for allowing drying air to exit the fan unit 20. The outlet 58, while illustrated and described as circular, may be any shape and not limited to a circular shape. A plurality of slits 60 are disposed on the sides of the base portion 34, serving as the air intakes, whereby the air enters the cavity 38 through the slits 60. A heating element 40 and a fan device 44 are disposed within the cavity 38, wherein the fan device 44 includes a fan blade 62 for drawing air into the cavity 38 of the housing 32 through the slits 60 and then blowing or forcing the air through the heating element 40, creating the drying air that exits the outlet 58 of the housing 32. The fan device 44 is engaged to the heating element 40 by a fan/heater adaptor 42 as shown in FIGS. 18 and 19. A timer 46 is disposed within the top portion 36 of the housing 32, along with a fan speed control 48 and a first power switch 50. The timer 46 contains a visual interface that may allow a user to control aspects of the fan unit 20, such as the run time. Alternatively, the timer 46 may display the time left for the drying operation, such as a countdown clock. When the drying time has finished, as determined by the timer 46, the fan unit 20 automatically shuts down or ceases operation and the fan device 44 ceases pushing air through the outlet 58 and the heating element 40 turns to the “off” position. The fan speed control 48 is communicatively coupled to the fan device 44, allowing a user to control the speed of the fan device 44. The first power switch 50, allows a user to control the heating element 40, by turning the heating element 40 to the “on” position and to the “off” position.

A second power switch 52 and a power connector 54 are located on the back side of the top portion 36 of the housing 12. The second power switch 52 controls the power to the fan unit 20, allowing a user to turn the fan unit 20 “on” and “off.” The power connector 54 allows a user to plug a power source into the fan unit 20. The DC power connector can accept a barrel plug from either a 120v/230v wall socket with a transformer, or a battery. The transformer steps the power down to 12v for the wall-powered option. A circuit board may be positioned within the cavity 38 of the housing 32 for engagement with the electrical components (first power switch 50, second power switch 52, fan speed control 48, timer 46, and power connector 54. By way of example only, a RoyPow 30 W portable charger with a 12V/10A cigarette lighter charger may be utilized in the present invention as the battery, but other types of batteries, including DC power sources, such as solar cells, fuel cells, and rectifiers that convert from AC to DC power, may be utilized that are able to power the fan unit 20 when not directly engaged to an AC power source.

A handle 64 may be disposed on the top portion 36. The handle 64 contains a first portion engaged to one side of the top portion 36 and a second portion engaged to an opposite side of the top portion 36. The first portion and the second portion extend upwardly from the top portion 36, and at a distance, the first portion and the second portion curve towards each other. A central member, extending overtop the top portion 36, connects the first portion to the second portion, collectively forming the handle 64 that is integral to the fan unit 20. The inner surface of the handle 64 (first portion, second portion, and central member) and exterior surface of the top portion 36 define a void 66, allowing a user to slide her fingers through the void 66, thereby gripping the handle 64 to lift, position, and transport the fan unit 20.

The top portion 36 of the fan unit 20 contains a top side, back side, and front side. The top side is oriented is horizontally oriented with the back side engaged to a back edge of the top portion 36 and the front side engaged to a front edge of the top portion 36. The back side extends downwardly from the back edge, extending at an angle outward from the back edge. The front side extends outwardly from the front edge and angled outwardly away from the top side. The handle 64 is disposed in close proximity to the back edge, and as illustrated, the first portion and the second portion of the handle 64 are engaged to the back side and the top side of the top portion 36 at the location where the intersection of the back side and the top side define the back edge. The transition between the top side and the front side has a curved appearance, wherein the front edge has a smooth appearance, without any edges or points, but a curved appearance as the front side is angled downward and away from the top side. The outlet 58 is disposed within the front side of the top portion 36, and preferably the outlet 58 is disposed on the lower portion of the front side or the portion of the front side opposite the portion engaged to the top side at the front edge. The outlet 58 of the fan unit 20 is generally circular for mating with the first end of the coupler device 12 that is also generally circular. The outlet 58 of the fan unit 20 preferably has a diameter slightly less than the diameter of the coupler device 12, allowing the outlet 58 to be received within the first end of the coupler device 12 and selectively secured therein by friction fit. The outlet 58 has a first end and a second end. The first end is engaged to the front side of the top portion 36 and the second end is engaged to the first end of the coupler device 12. The second end of the outlet has an outside diameter slightly less than the outside diameter of the first end. As the outlet 58 protrudes outward from the front side of the top portion 36, at a predetermined distance, the outside diameter of the outlet 58 is reduced. A skirt is formed at the transition between the larger outside diameter and the reduced outside diameter. The skirt circumscribes the outlet 58 and extends in the axial direction of the outlet 58, forming a smooth and flat contact point.

The portable air dryer device 10 and its component parts (coupler devices, 12, 12'', 12''', etc.; drying manifolds 14,14', 14'', etc.; dryer attachments (boot dryer attachment(s) 16 and glove/shoe dryer attachment 18); fan unit 20; and end piece 30) may be housed in a bag, such as a drawstring bag, for storage and transportation, or a container, such as a box, bin, carrying case, and the like, for storage and transportation. Alternatively, the portable air dryer device 10, with or without the fan unit 20, may be stored and transported in a first bag and the boot dryer attachment(s) 16 and glove/shoe dryer attachment(s) 18 may be stored and transported in a second bag, wherein the first bag and the second bag may be a drawstring bag. A hair dryer may be substituted for the fan unit 20, which can be especially useful when traveling.

Figure 6:
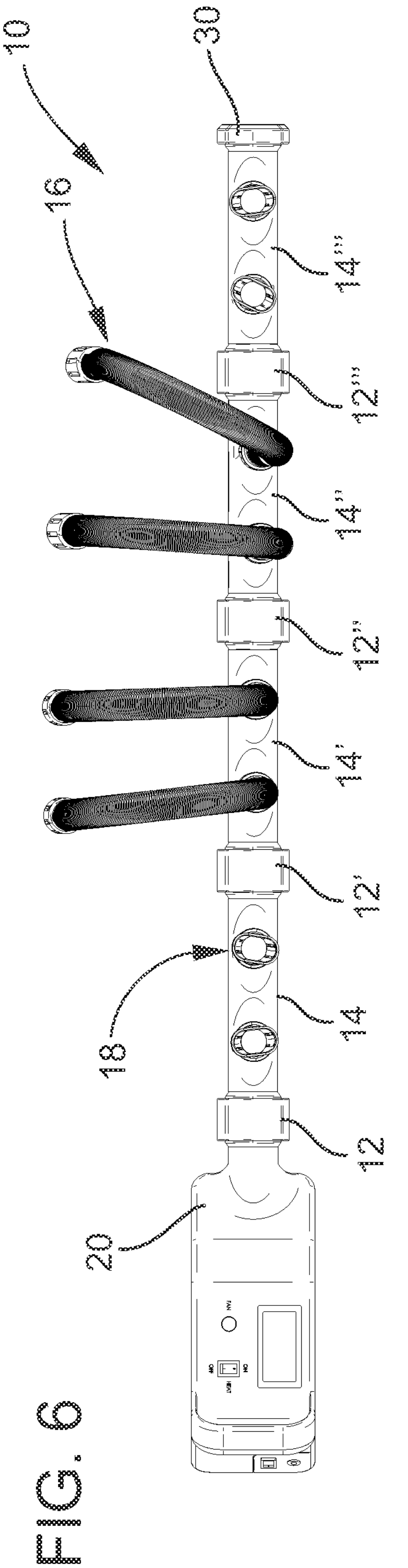
FIG. 6 is a top view of an exemplary embodiment of the portable dryer device and fan unit of the present invention.

Another exemplary embodiment of the portable dryer device is illustrated in FIGS. 20-28 and shown generally at reference numeral 110. As described in the embodiment above, this exemplary embodiment of the portable modular dryer device 110 generally comprises a coupler device 112, at least one drying manifold 114, and a dryer attachment, such as at least one boot dryer attachment 116, and/or at least one glove/shoe dryer attachment 118, and a fan unit 120. The fan unit 120 is engaged to a distributing manifold 150 that is generally "T-shaped" and contains one inlet and two outlets. The distributing manifold 150 contains an internal passageway that extends from the inlet and proceeds to each outlet. The drying air enters the inlet of the distributing manifold 150, and at a predetermined distance, the passageway diverges into opposite directions towards the outlets located on opposite sides of the distributing manifold 150. The outlet of the fan unit 120 is inserted into the opening of the passageway in the inlet of the distributing manifold 150. A lip surrounds the opening of the passageway in the inlet of the distributing manifold 150 that contacts the skirt on the outlet of the fan unit 120. A first side of a first drying manifold 114 is inserted into the opening of the passageway in one of the outlets of the distributing manifold 150 and a first side of a second drying device 114' is inserted into the opening of the passageway in the other or opposed outlet of the distributing manifold 150, as shown in FIGS. 6 and 7, thus engaging the first drying manifold 114 and the second drying manifold 114' to the distributing manifold 150 in a selectively secured arrangement. The diameter of the first side of the first drying manifold 114 and the first side of the second drying manifold 114'*is* smaller than the diameter of the opening of the passageways of the outlets in the distributing manifold 150, allowing the first side of the first drying manifold 114 and the first side of the second drying manifold 114' to be received within the passageways of the outlets of the distributing manifold 150.

A coupler device 112, as described more fully above in the first embodiment, is utilized for engaging multiple drying manifolds (114, 114', 114'', 114''', etc.). As shown, the second side of the first drying manifold 114 is inserted into an opening in the passageway of the first coupler device 112. The second side of the second drying manifold 114' is inserted into an opening of the passageway of the second coupler device 112'. The first side of the third drying manifold 114'' is inserted into the opening of a passageway in the first coupler device 112, thus creating a continuous passageway between an outlet in the distributing manifold 150, through the first drying manifold 114, the first coupler device 112, and the second drying manifold 114''. The first side of the fourth drying manifold 114''' is inserted into the opening of the passageway on the second coupler device 112', thus creating a continuous passageway between an outlet in the distributing manifold 150, through the second drying manifold 114', the second coupler device 112', and the third drying manifold 114'''. Additional coupler devices 112 may be engaged to the second side of the fourth drying manifold 114'' and the second side of the third drying manifold 114''. As illustrated, a first end piece 130 is engaged to the second side of the fourth drying manifold 114'', and a second end piece 30' is engaged to the second side of the third drying manifold 114''.

While this embodiment incorporates a distributing manifold 150, the structure and function of the other component parts, such as the coupler devices 112, drying manifold 114, dryer attachments (boot dryer attachment 116 and glove/shoe dryer attachment 118), fan unit 120, adapter portion 122, hose portion 124, boot insertion portion 126, mounting apparatus 128, and end piece 130 are the same described above for the first embodiment in paragraphs, including the method of engaging the components (coupler devices 112, drying manifold 114, dryer attachments (boot dryer attachment 116 and glove/shoe dryer attachment 118), fan unit 120, adapter portion 122, hose portion 124, boot insertion portion 126, mounting apparatus 128, and end piece 130) and incorporated fully into this embodiment. Likewise, the function of the entire device 110 is the same as described above in the first embodiment in paragraphs, and incorporated fully into this embodiment, except for the inclusion of the distributing manifold 150, wherein the drying air from the fan unit 120 is forced through the two outlets. The fan unit 120 is also the same as described above in paragraphs and incorporated fully into this embodiment.

The portable air dryer device 110 and its component parts (coupler devices 112, 112'', 112''', etc.; drying manifolds 114, 114', 114'', etc.; dryer attachments (boot dryer attachment(s) 116 and glove/shoe dryer attachment 118); fan unit 120; and end piece 130) may be housed in a bag, such as a drawstring bag, for storage and transportation, or a container, such as a box, bin, carrying case and the like, for storage and transportation. Alternatively, the portable air dryer device 110, with or without the fan unit 120, may be stored and transported in a first bag and the boot dryer attachment(s) 116 and glove/shoe dryer attachment(s) 118 may be stored and transported in a second bag, wherein the first bag and the second bag may be a drawstring bag. A hair dryer may be substituted for the fan unit 120, which can be especially useful when traveling.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A portable modular drying device, comprising:

at least one drying manifold having a first end, a second end, and at least one opening between the first end and the second end for distributing drying air;

a coupler device having a first end, a second end, an outer housing and a hollow passageway extending from the first end to the second end, wherein the outer housing contains a flat bottom portion, wherein the flat bottom portion further defines a mounting member configured to engage a mounting apparatus, and the mounting apparatus is configured to be removably attachable to another structure; and at least one dryer attachment adjacent the at least one opening of the at least one drying manifold.

2. The portable modular drying device according to claim 1, further comprising a fan unit engaged to the at least one drying manifold for supplying the drying air.

3. The portable modular drying device according to claim 1, wherein the at least one dryer attachment contains a first end and a second end, wherein the first end contains an adaptor portion disposed adjacent the at least one opening of the at least one drying manifold, a hose portion engaged to the adaptor portion, and an insertion portion, whereby the drying air proceeds through the adaptor portion and hose portion, exiting the insertion portion.

4. The portable modular drying device according to claim 1, further comprising a distributing manifold having an inlet and two outlets, at least two drying manifolds engaged to the two outlets.

5. The portable modular drying device according to claim 1, wherein the at least one dryer attachment contains an adaptor portion disposed adjacent the at least one opening of the at least one drying manifold and a tapered portion extending outwards from the adaptor portion.

6. The portable modular drying device according to claim 1, further comprising the mounting apparatus, wherein the mounting apparatus comprises at least one rib that engages the mounting member for mounting the portable modular drying device.

7. The portable modular drying device according to claim 1, wherein the coupler device contains a first edge and a second edge and an arcuate shaped top portion extending from the first edge to the second edge.

8. The portable modular drying device according to claim 1, wherein the mounting member is oriented perpendicularly to an orientation of the at least one drying manifold.

9. The portable modular drying device according to claim 1, wherein the at least one opening is configured to receive attachment of a rigid tube of the at least one dryer attachment and a flexible tube of the at least one dryer attachment.

10. The portable modular drying device according to claim 1, wherein the at least one opening comprises a first opening and a second opening, wherein the first opening receives attachment of a rigid tube of the at least one dryer attachment and the second opening receives attachment of a flexible tube of the at least one dryer attachment.

11. The portable modular drying device according to claim 2, wherein the fan unit further comprises a second mounting member configured to engage the mounting apparatus.

12. A kit for drying comprising:

at least one drying manifold having a first end, a second end, and at least one opening between the first end and the second end for distributing drying air;

a coupler device having a first end, a second end, an outer housing and a hollow passageway extending from the first end to the second end, wherein the outer housing contains a flat bottom portion, wherein the flat bottom portion further defines a mounting member configured to engage a mounting apparatus, and the mounting apparatus is configured to be removably attachable to another structure; and at least one dryer attachment adjacent the at least one opening of the at least one drying manifold.

13. The kit for drying according to claim 12, further comprising a fan unit.

14. The kit for drying according to claim 12, further comprising a distributing manifold having an inlet and two outlets, at least two drying manifolds engaged to the two outlets.

15. The kit for drying according to claim 12, wherein the at least one dryer attachment contains an adaptor portion disposed adjacent the at least one opening of the at least one drying manifold and a tapered portion extending outwards from the adaptor portion.

16. The kit for drying according to claim 12, further comprising the mounting apparatus, wherein the mounting apparatus comprises at least one rib that engages the mounting member for mounting a portable modular drying device comprising the at least one drying manifold, the coupler device, and the at least one dryer attachment.

17. The kit for drying according to claim 12, wherein the coupler device contains a first edge and a second edge and an arcuate shaped top portion extending from the first edge to the second edge.

18. The kit for drying according to claim 12, further comprising at least one bag for carrying and transporting the at least one drying manifold and at least one dryer attachment.

19. The kit for drying according to claim 12, further comprising at least one container for carrying and transporting the at least one drying manifold and at least one dryer attachment.

20. A method for drying, comprising:

providing a fan unit, a coupler device for receiving an outlet of the fan unit that distributes air through the coupler device having a first end, a second end, an outer housing and a hollow passageway extending from the first end to the second end, wherein the outer housing contains a flat bottom portion, wherein the flat bottom portion further defines a mounting member configured to engage a mounting apparatus, and the mounting apparatus is configured to be removably attachable to another structure, a portable modular drying device comprising at least one drying manifold having a first end, a second end, and at least one opening between the first end and the second end for distributing the drying air, and at least one dryer attachment adjacent the at least one opening of the at least one drying manifold;

mounting the coupler device to the mounting apparatus by engaging the mounting member;

attaching the fan unit to the coupler device and attaching the coupler device to the drying manifold;

attaching the at least one dryer attachment to the drying manifold;

blowing drying air from the fan unit into the drying manifold; and attaching an article for drying to the at least one dryer attachment for drying the article.

* * * * *